United States Patent
Tang et al.

(10) Patent No.: US 11,949,928 B2
(45) Date of Patent: Apr. 2, 2024

(54) VIDEO LOADING METHOD AND DEVICE

(71) Applicant: SHANGHAI BILIBILI TECHNOLOGY CO., LTD., Shanghai (CN)

(72) Inventors: Junxing Tang, Shanghai (CN); Zhaoxin Tan, Shanghai (CN); Sheng Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 92 days.

(21) Appl. No.: 17/532,661

(22) Filed: Nov. 22, 2021

(65) Prior Publication Data
US 2022/0167024 A1    May 26, 2022

(30) Foreign Application Priority Data

Nov. 20, 2020    (CN) .......................... 202011305126.1
Nov. 20, 2020    (CN) .......................... 202011309580.4
Nov. 20, 2020    (CN) .......................... 202011312862.X

(51) Int. Cl.
*H04N 21/235*    (2011.01)
*H04N 21/654*    (2011.01)

(52) U.S. Cl.
CPC ......... *H04N 21/235* (2013.01); *H04N 21/654* (2013.01)

(58) Field of Classification Search
CPC ............................ H04N 21/235; H04N 21/654
See application file for complete search history.

(56) References Cited

U.S. PATENT DOCUMENTS

| 2007/0283392 A1* | 12/2007 | Tsusaka | ............. | H04N 21/4756 348/E7.071 |
| 2012/0059825 A1* | 3/2012 | Fishman | ............. | G06F 16/4387 707/737 |

(Continued)

FOREIGN PATENT DOCUMENTS

| CN | 104918071 A | 9/2015 |
| CN | 106210902 A | 12/2016 |

(Continued)

OTHER PUBLICATIONS

Haiwei et al.; "P2P video-on-demand system caching scheme based on data scarcity P2P video-on-demand system caching scheme based on data scarcity"; Data Base Technique—Electronic Technology & Software Engineering; Jul. 2013; p. 111-113 (*Google English Translation*).

*Primary Examiner* — Nicholas T Corbo
(74) *Attorney, Agent, or Firm* — BakerHostetler

(57) ABSTRACT

The present disclosure provides techniques of preloading video data. The techniques comprises acquiring a video to be played; acquiring information indicative of historical behaviors of users who watched the video; segmenting the video into a plurality of video segments; determining a historical search rate corresponding to each of the plurality of video segments based on the information indicative of the historical behaviors of the users; and determining a video segment among the plurality of video segments as a first target video segment based on the historical search rate corresponding to each of the plurality of video segments, wherein the video segment has a historical search rate greater than or equal to a preset probability threshold; and preloading the first target video segment of the video.

16 Claims, 11 Drawing Sheets

(56) References Cited

U.S. PATENT DOCUMENTS

| | | | |
|---|---|---|---|
| 2014/0068692 A1* | 3/2014 | Archibong | H04N 21/6334 725/116 |
| 2016/0366466 A1* | 12/2016 | Shen | G06Q 50/01 |
| 2017/0168660 A1* | 6/2017 | Li | G10L 13/08 |
| 2017/0169857 A1* | 6/2017 | Zhao | G11B 27/10 |
| 2017/0171601 A1* | 6/2017 | Cui | H04N 21/4884 |
| 2017/0195720 A1* | 7/2017 | Zuo | H04N 21/8133 |
| 2017/0251240 A1* | 8/2017 | Peng | H04N 21/472 |
| 2017/0264585 A1* | 9/2017 | Xu | H04L 51/52 |
| 2017/0272800 A1* | 9/2017 | Wang | H04N 21/233 |
| 2018/0191857 A1* | 7/2018 | Schooler | G06F 16/24568 |
| 2018/0213268 A1* | 7/2018 | Yan | H04N 21/238 |
| 2019/0103137 A1 | 4/2019 | Raju et al. | |

FOREIGN PATENT DOCUMENTS

| | | |
|---|---|---|
| CN | 108260014 A | 7/2018 |
| CN | 110087115 A | 8/2019 |
| CN | 110740373 A | 1/2020 |
| CN | 110740374 A | 1/2020 |
| CN | 111107438 A | 5/2020 |

\* cited by examiner

VIDEO LOADING METHOD AND DEVICE

The present disclosure claims priority to Chinese Patent Application Nos. 202011312862.X, 202011309580.4, and 202011305126.1, titled "VIDEO LOADING METHOD AND DEVICE", filed on Nov. 20, 2020 with the National Intellectual Property Administration, PRC, which are incorporated herein by reference in their entireties.

BACKGROUND

As various smart terminals are widely applied, people are becoming more and more accustomed to watching videos through smart terminals. Generally, users watch videos mainly online, that is, by using streaming media in which videos are played while being loaded. When a user watches a video through a streaming media player, the streaming media player usually pre-loads a part of the video, so that the user can watch the video fluently.

SUMMARY

In view of this, a video loading method, a video loading device, a computing device, and a computer-readable storage medium are provided according to embodiments of the present disclosure, to solve the technical defect that a fast-forwarded video file cannot be played quickly in the conventional art.

According to the first aspect of the embodiments of the present disclosure, a video loading method is provided, which includes acquiring a to-be-played video and a historical user behavior of watching the to-be-played video in history; segmenting the to-be-played video into multiple video segments, and determining a historical search rate of each of the video segments based on the historical user behavior; and determining a video segment with a historical search rate greater than or equal to a preset probability threshold as a target video segment, and preloading a video in the target video segment.

According to a second aspect of the embodiments of the present disclosure, a video loading device is provided, which includes: a video acquiring module, a search rate determining module, and a video preloading module. The video acquiring module is configured to acquire a to-be-played video and a historical user behavior of watching the to-be-played video in history. The search rate determining module is configured to segment the to-be-played video into multiple video segments, and determine a historical search rate of each of the video segments based on the historical user behavior. The video preloading module is configured to determine a video segment with a historical search rate greater than or equal to a preset probability threshold as a target video segment, and preload a video in the target video segment.

According to a third aspect of the embodiments of the present disclosure, a computing device is provided, which includes: a memory and a processor. The memory is configured to store computer-executable instructions. The processor is configured to execute the computer-executable instructions, to perform steps of the video loading method.

According to a fourth aspect of the embodiments of the present disclosure, a computer-readable storage medium is provided, which stores computer-executable instructions. The computer instructions, when executed by a processor, perform steps of the video loading method.

With the video loading method and device according to the embodiments of the present disclosure, a to-be-played video and a historical user behavior of watching the to-be-played video in history are acquired, the to-be-played video is segmented into multiple video segments, and a video segment with a historical search rate greater than or equal to a preset probability threshold is determined as a target video segment, and a video in the target video segment is preloaded. With the video loading method, the to-be-played video is segmented into multiple video segments and the historical search rate of each of the video segment is determined based on the historical user behavior of watching the to-be-played video, in a case of a to-be-loaded user, a video segment with a historical search rate greater than a preset threshold is preloaded first, such that when the user fast-forwards the video, a node that the video is fast-forwarded to has been preloaded in the video file, which makes the video play smoothly. In this way, the play content in the video meets the requirements of the user, and the user does not need to wait for a long time period for video loading, which improves the user experience.

DETAILED DESCRIPTION OF EMBODIMENTS

Figure 1:
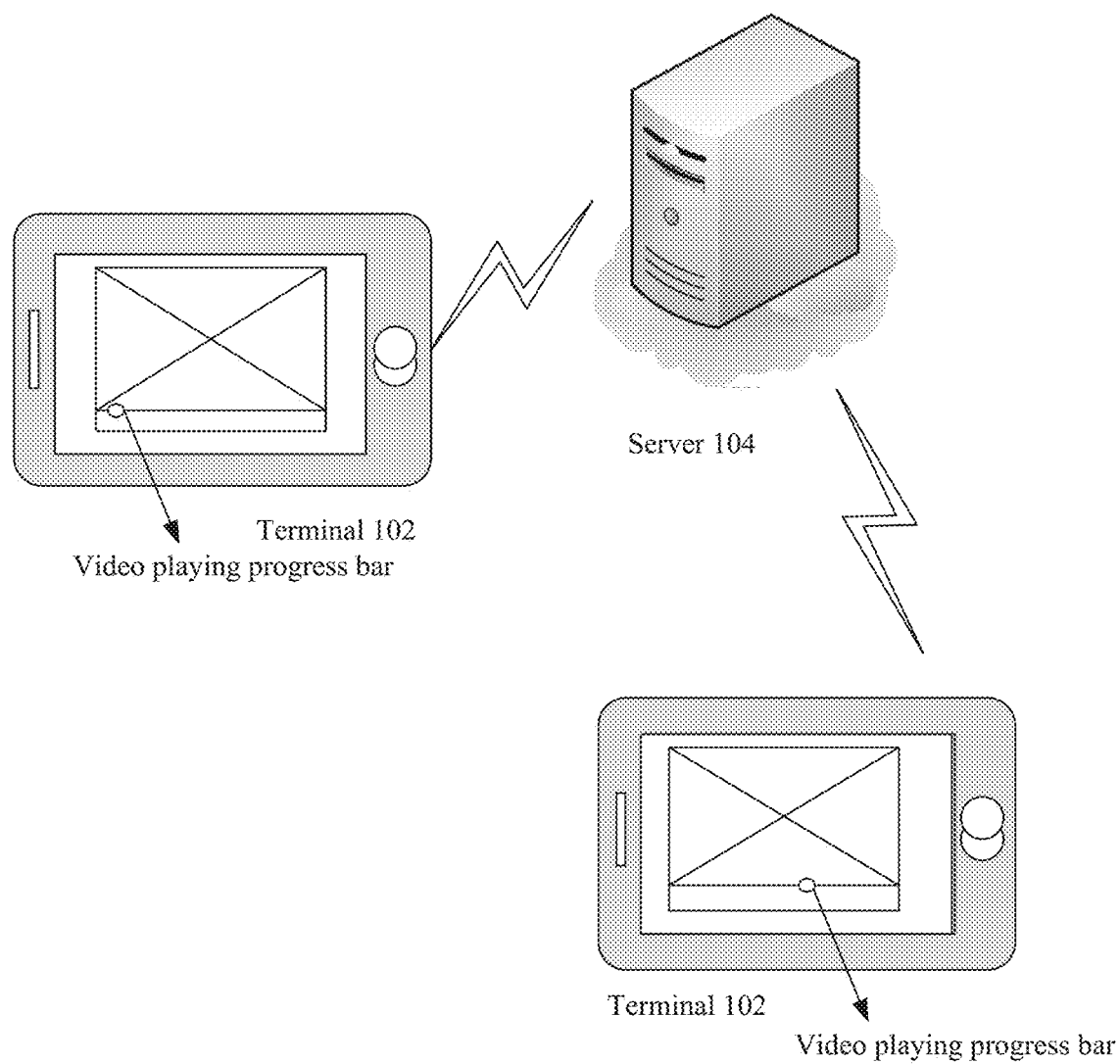
FIG. 1 is a schematic diagram of an exemplary application scenario of a video loading method according to an embodiment of the present disclosure.

Many specific details are explained in the following description, to fully understand the present disclosure. However, the present disclosure may be implemented in many ways other than those described herein, and those skilled in the art may make similar extensions without violating the connotation of the present disclosure. Therefore, the present disclosure is not limited to embodiments disclosed below.

The terms used in one or more embodiments of the present disclosure are only for the purpose of describing the specific embodiments, and are not intended to limit the one or more embodiments of the present disclosure. The singular forms of "a", "said" and "the" in the one or more embodiments and the claims of the present disclosure are also intended to include plural forms, unless being clearly indicated by other meanings in the context. It should also be understood that the term "and/or" in the one or more embodiments of the present disclosure refers to and includes any or all possible combinations of one or more associated listed items.

It is to be understood that although the terms "first", "second", and the like may be used to describe various kind of information in one or more embodiments of the present disclosure, the information should not be limited to these terms. These terms are only used to distinguish the same kind of information from each other. For example, without departing from the scope of one or more embodiments of the present disclosure, "the first" may also be referred to as "the second", and similarly, "the second" may also be referred to as "the first". Depending on the context, the word "if" used herein may be interpreted as "when" or "in a case that" or "in response to a determination".

First, the terms involved in one or more embodiments of the present disclosure are explained. A streaming media player is a component that loads a network resource stream, and decodes and plays the network resource stream.

For a hot area, in a network video playing scene, not all areas have the same probability of being played. Because of the difference in video content, some areas may have a higher probability of being watched than other areas, and these areas are called as hot areas.

For preloading, in a streaming media playing scene, preloading is performed to improve the watching fluency. A long preloading time period may bring a good watching fluency. However, because the preloaded part may not necessarily be played, a great waste of bandwidth may be caused.

A seek operation indicates an operation of jumping to another play position by a user using a mouse or keyboard.

A flow rate is used to describe a volume of data, and has the unit of B (bit). A bandwidth is used to describe a speed of a data flow, and may have the unit of B/S (bits per second), KB/S (kilobytes per second), or M/S (megabytes per second).

For the bandwidth cost, streaming media services tend to generate a large amount of traffic, and there are generally two traffic billing modes, including billing based on traffic and billing based on a maximum bandwidth. When the service volume is large, the bandwidth billing mode is often used.

For a recommendation position, in order to improve perception of a user on content of a video website, recommendation positions are often arranged around a currently played video, to recommend video content related to the current video.

In practice, according to methods of optimizing a video loading speed, a size of a header packet may be reduced during a video compression stage, a play link may be optimized, and a header of a video may be loaded before being played, so as to load and display a first frame of the video quickly when the video is started. A video loading method is provided according to the present disclosure, which is performed to optimize the starting speed of a video header by using recommendation positions.

In practice, during a video loading process, it is required to wait for buffering the video, only when the video is buffered to a certain level, the video can be played. If a play speed exceeds a buffering speed, the video will be paused and cannot be played until the buffering is completed. In addition, when the user fast-forwards a video, if the buffered part of video does not reach the node that the video is fast-forwarded to, the buffering may be started at that node, and the user needs to wait again, resulting in a poor watching experience. The present disclosure provides a way to determine a historical search rate of a to-be-played video based on the historical user behavior, so as to determine a video segment for preloading.

In the present disclosure, a video loading method, a video loading device, a computing device, and a computer-readable storage medium are provided according to embodiments of the present disclosure, which are described in detail in the following embodiments.

When a user fast-forwards a video while watching the video, the video may not be loaded to a time node where the user desires due to the slow network speed and high definition of the video file, which may interrupt the play of the video file. In this case, the user needs to wait for the loading of the video file, and the entire loading process greatly reduces the user experience. The present disclosure provides techniques of resolving such issue.

Referring to FIG. 1, FIG. 1 is a schematic diagram of an exemplary application scenario of a video loading method according to an embodiment of the present disclosure.

The application scenario of FIG. 1 includes a terminal 102 and a server 104. Specifically, the user sends a selected to-be-played video to the server 104 by the terminal 102. After receiving the to-be-played video, the server 104 acquires a historical user behavior of watching the to-be-played video, segments the to-be-played video into multiple video segments based on a preset time length, and determine a historical search rate of each of the video segment based on historical user behavior. In addition, the server 104 also acquires a historical behavior of a current user watching the to-be-played video, and determine whether the current user is a to-be-loaded user. In a case of determining that the current user is a to-be-loaded user in a play interface of the to-be-played video through a video playing progress bar, the server 104 determines a video segment with a history search rate greater than or equal to a preset probability threshold as a target video segment. For example, the to-be-played video is segmented into 5 video segments, that is, a segment 1, a segment 2, a segment 3, a segment 4, and a segment 5, and the historical search rates of the 5 video segments are calculated respectively as 10%, 40%, 12%, 23%, 15%, if the preset probability threshold is 35%, the video segment with a historical search rate greater than 35% is determined as the target video segment, that is, the segment 2 in the to-be-played video is preloaded as the target video segment.

With the video loading method in the embodiment of the present disclosure, the historical search rate of each video segment in the to-be-played video is determined based on the acquired historical user behavior of the to-be-played video, so as to preload the target video segment in the to-be-played video. In this way, when the user fast-forwards the video, the video segments that the user may be fast-forwarded to are preloaded, reducing the possibility of the user waiting for a long time period of video loading.

Figure 2:
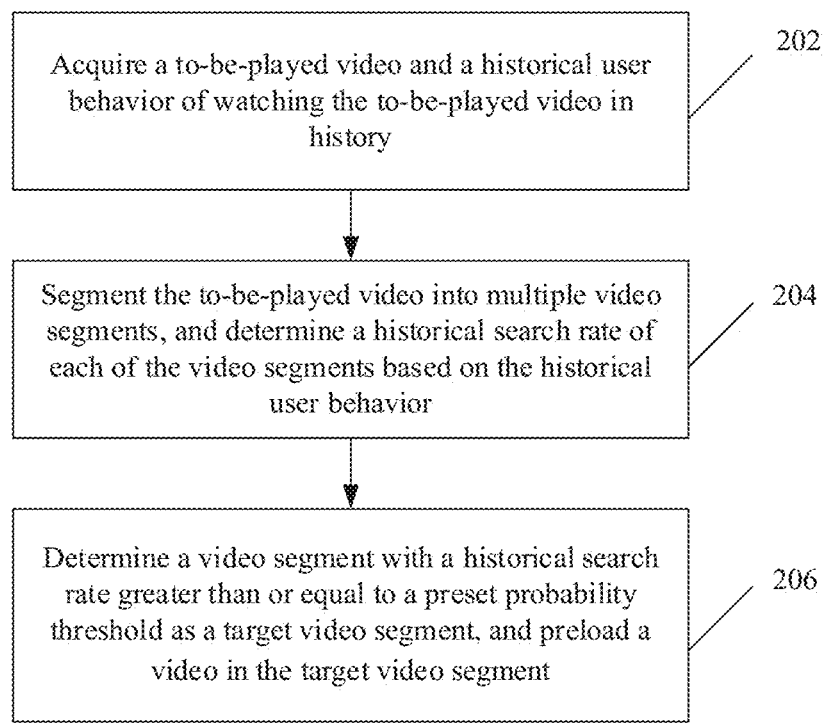
FIG. 2 is a flowchart of a video loading method according to an embodiment of the present disclosure.

Referring to FIG. 2, FIG. 2 is a flowchart of a video loading method according to an embodiment of the present disclosure. The video loading method includes the following steps 202 to 206.

In step 202, a to-be-played video and a historical user behavior of watching the to-be-played video in history are acquired.

Specifically, the to-be-played video may be a video that the user wants to play in a video website, and the historical user behavior may be a user behavior of other historical users watching the to-be-played video, such as a video click behavior, a comment behavior, and a sharing behavior.

Specifically, the to-be-played video is determined based on a watching requirement of a user on a video website. After acquiring the to-be-played video, the server also acquires the historical user behavior of a historical user on the to-be-played video, such as a click behavior of a historical user on the to-be-played video, a comment behavior for the to-be-played video, or a sharing behavior of the to-be-played video.

For example, if a user A watches a video A on a video play website, the video A is a to-be-played video A, and the server acquires the to-be-played video A that the user A wants to watch, and the historical user behavior of watching the to-be-played video A in history, such as a behavior of commenting on a play interface of the to-be-played video A, a behavior of sending a bullet screen on the play interface of the to-be-played video A, a behavior of sharing the to-be-played video A. In the video playing field, a bullet screen function is popular. Bullet screens comprise user comments on a video, and the bullet screens move across display screen (e.g., from right to left, left to right, top to bottom, or bottom to top) over the content (e.g., video frames).

In step 204, the to-be-played video is segmented into multiple video segments, and a historical search rate of each of the video segments is determined based on the historical user behavior.

Further, the segmenting the to-be-played video into multiple video segments includes: segmenting the to-be-played video into multiple video segments based on a preset time length.

Specifically, the preset time length may be a time length of each of the multiple video segments obtained by segmenting the to-be-played video. For example, if the preset time length is set to 5 seconds, the time length of each video segment obtained by the server is 5 seconds. Alternatively, the preset time length is set to 10 seconds, the time length of each video segment obtained by the server is 10 seconds.

It is to be noted that the preset time length may be determined based on the total time length of the to-be-played video. If the total time length of the to-be-played video is long, the preset time length set by the server may be correspondingly long, the preset time length is not limited in the present disclosure.

In the embodiment of the present disclosure, by segmenting the to-be-played video into the video segments based on the preset time length, it can be ensured that the video segment that the user may be fast-forwarded to can be preloaded without wasting network resources, reducing the possibility of the user waiting for a long time period of video loading.

Specifically, the historical search rate may be a probability that a historical user searches for a video segment in the to-be-played video, which may be determined based on, for example, the number of times the historical user searches for the video segment that the user is interested in during the play of the to-be-played video. In practice, a video segment may be searched by the user through directly dragging a progress bar in a video play interface to jump to a video segment that the user is interested in.

Specifically, after receiving the to-be-played video, the server segments the to-be-played video into multiple video segments based on a preset time length, and determines the historical search rate of each video segment based on the historical user behavior of the historical user for the to-be-played video.

In practice, according to degree of interest of the user in content of a to-be-played video, the content of the to-be-played video may include two types: ordinary video content and interesting hot content. After acquiring the to-be-played video, the server may segment the to-be-played video into multiple video segments based on a preset time length that is determined by the total time length of the to-be-played video, where the multiple video segments include multiple segments of common video content and multiple segments of interesting hot content. During the playing of the to-be-played video, the user may jump the to-be-played video to a video segment that the user is interested in through a seek operation, or directly search for a keyword that the user is interested in from the content of the to-be-played video through a search box, to jump the to-be-played video skips directly to the video segment that the user is interested in, and calculate the historical search rate of each video segment based on the historical user behavior of the historical user for the to-be-played video.

In order to determine the target video segment for preloading, the historical search rate of each video segment is determined based on the historical user behavior of watching the to-be-played video in history. Specifically, the determining the historical search rate of each of the video segments based on the historical user behavior including: determining, based on the historical user behavior, the number of times each of the video segments has been searched for by a historical user; and determining, based on the number of times each of the video segments has been searched for, the historical search rate of each of the video segments in the multiple video segments.

Specifically, the historical user behavior may be a comment behavior, a sharing behavior, and a forwarding behavior of a user for each video segment.

Specifically, after segmenting the to-be-played video into multiple video segments, based on the comment behavior, the sharing behavior, or the search click behavior of a user on each video segment, the number of times each video segment is searched for by the historical user is determined, and the historical search rate of each video segment in the multiple video segments is determined based on the number of times each video segment is searched for.

For example, if the number of times each video segment is searched for by the historical user is determined based on the historical user behavior which is a comment behavior on the video segment, the server segments the to-be-played video into 5 video segments, and the historical user has different comment behaviors on the 5 video segments, if the number of historical user comments on the first video segments is 50, it may be determined that the number of times that the historical user searches is 50; if the number of historical user comments on the second video segment is 100, it may be determined that the number of times that the historical user searches is 100; if the number of historical user comments on the video segment is 60, it may be determined that the number of times that the historical user searches is 60; if the number of historical user comments on the fourth video segment is 80, it may be determined that the number of times that the historical user searches is 80; and if the number of historical user comments on the fifth video segment is 150, it may be determined that the number of times that the historical user searches is 150. Based on the number of times that the historical user searches on each of the 5 video segments, the historical search rate of each of the video segments is calculated, that is, the historical search rate of the first video segment is 11%, the historical search rate of the second video segment is 23%, the historical search rate of the third video segment is 14%, the historical search rate of the fourth video segment is 18%, and the historical search rate of the fifth video segment is 34%.

It is to be noted that a video segment with a larger number of times of searches by the historical user may be referred to as a hot area, that is, each video segment in the to-be-played video is not necessarily selected by the user, and the video segment at a hot area is watched by the user with a higher probability than that of other video segments.

In the embodiment of the present disclosure, the number of times that the historical user searches is determined based on a historical user behavior on each video segment, to determine the historical search rate of each video segment in multiple video segments. By using the historical search rate, a video segment that the user is interested in can be determined intuitively, so as to accurately determine a video segment that the user may jump to, so that the user is unnecessary to wait for preloading the video segment that the user is interested in.

In step 206, a video segment with a historical search rate greater than or equal to a preset probability threshold is determined as a target video segment, and a video in the target video segment is preloaded.

Specifically, the determining a video segment with a historical search rate greater than or equal to a preset probability threshold as a target video segment includes: acquiring a historical behavior of a current user watching the to-be-played video; and determining, if it is determined that the current user is a to-be-loaded user based on the historical behavior of the current user, a video segment with a historical search rate greater than or equal to the preset probability threshold as the target video segment.

Specifically, the historical behavior of the current user may be an operation behavior of a user currently watching the to-be-played video performed on the to-be-played video. In practice, some users may use the mouse or keyboard to jump to another play position when watching the to-be-played video, that is, through a seek operation, while some other users watch the to-be-played video in a normal play order without jumping to another play position of the to-be-played video when watching the to-be-played video.

Specifically, the to-be-loaded user may be a user determined based on the historical user behavior of the current user who directly watches a video segment in a hot area of the to-be-played video through a seek operation on the to-be-played video when watching the to-be-played video.

Specifically, if the current user is determined to be a to-be-loaded user based on the historical behavior of the current user, the server needs to preload the to-be-played video, and the video segment to be preloaded is determined based on the historical search rate of the user for the video segments in the to-be-played video, then a video segment with a historical search rate greater than or equal to the preset probability threshold is determined as the target video segment, and a video in the target video segment is preloaded. It is to be noted that the determination of the historical search rate may be referred to the above embodiment, which is not repeated here. The number of the target video segment may be one or multiple, which is not limited in the present disclosure.

In the embodiment of the present disclosure, it is determined whether the current user is a user who desires video jumping and loading when watching the video based on historical behavior of the current user, and then a video segment with a high historical search rate in the to-be-played video is preloaded for the user, which meets the watching requirement of the user, and also improves the efficiency of video loading.

Further, after acquiring the historical behavior of the current user watching the to-be-played video, the server determines a user attribute of the current user based on the historical behavior of the current user, and preloads the to-be-played video according to different video loading strategies corresponding to different user attributes. Specifically, after acquiring a historical behavior of a current user watching the to-be-played video, the method further includes: if it is determined that the current user is not a to-be-loaded user based on the historical behavior of the current user, preloading the to-be-played video in an initial loading way.

Specifically, the user who is not a to-be-loaded user may indicate that based on the historical user behavior of the current user, it may be determined that when watching a video, the current user watches the to-be-played video in the normal video play order instead of directly watching a video segment in a hot area of the to-be-played video through the seek operation on the to-be-played video.

In an implementation, the server acquires the historical behavior of the current user and determines that the current user watches the to-be-played video in the normal video play order, that is, the current user is not a to-be-loaded user, and the to-be-played video is preloaded in an initial loading way. The initial loading way is common in streaming media players. For example, if a loading step for the user to watch the to-be-played video is 5 seconds, when the user is watching a video content of the $5^{th}$ second in the to-be-played video, the to-be-played video has preloaded to the $10^{th}$ seconds, to ensure that the loading time of the to-be-played video is ahead of the playing time, so as to ensure that the to-be-played video is played normally.

In the embodiment of the present disclosure, in a case of determining that the current user is not a to-be-loaded user, the to-be-played video is pre-loaded in the initial loading way, such that different loading strategies can be used for the to-be-played video according to different user requirements. In this way, it can be ensured that the user watches the to-be-played video normally, and the waste of network resources caused by preloading can also be avoided.

By acquiring and preloading the target video segments, the video segment that the to-be-loaded user jumps to can be preloaded successfully when the to-be-loaded user is watching the to-be-played video, so that the video is played smoothly. Therefore, candidate video segments may be determined based on the attribute information of the user, to increase the probability of the target video segment being selected by the user. The implementation is described as follows.

Before the determining a video segment with a historical search rate greater than or equal to the preset probability threshold as a target video segment, the method further includes: acquiring attribute information of a current user and attribute information of historical users, and comparing the attribute information of the current user with the attribute information of the historical users; and determining a video segment searched by a historical user that matches the attribute information of the current user as a candidate video segment.

Specifically, the attribute information may be basic information or behavior information of a user, such as the gender, age, preferences of the user, or a behavior of the user fast-forwarding the video through the seek operation.

In an implementation, the server acquires the attribute information of the current user watching the to-be-played video, and determines the attribute information of the historical user watching the to-be-played video based on the attribute information of the current user, where the number of the historical user watching the to-be-played video may be multiple. The server compares the attribute information of multiple historical users with the attribute information of the current user watching the to-be-played video, and determines, based on the attribute information of the historical user matches the attribute information of the current user, a video segment searched by the historical user in history or a video segment that the historical user directly jumped to is determined as a candidate video segment, where the number of the candidate video segment may be multiple.

For example, if the attribute information of the current user A indicates "Female-25-preferring gunfight video segments", a historical user B is determined by comparing the attribute information of the current user A with that of multiple historical users watching the to-be-played video, and a video segment searched by the historical user B or a video segment that the historical user B directly jumped to when watching the to-be-played video is determined as a candidate video segment of the current user A for preloading.

In the embodiment of the present disclosure, the historical user watching the to-be-played video in history is determined based on the attribute information of the current user watching the to-be-played video, and a historically searched video segment in the to-be-played video is determined based on the attribute information of the historical user as a preloaded video segment for the current user watching the to-be-played video. In this way, a preloaded video segment can be determined for the current user based on the attribute information of the historical user, such that the preference of the current user can be quickly determined, and the probability of the preloaded video segment being selected by the current user can be improved.

After determining the candidate video segment of the to-be-played video based on the attribute information of the historical user, the target video segment may be determined from multiple candidate video segments as follows.

The determining a video segment with a historical search rate greater than or equal to a preset probability threshold as a target video segment includes: determining a historical search rate of the candidate video segment; and determining a candidate video segment with a historical search rate greater than or equal to the preset probability threshold as the target video segment.

In an implementation, the server determines a historical search rate of the historical user on each of the acquired multiple candidate video segments, and determines a candidate segment with a historical search rate greater than or equal to the preset probability threshold as the target video segment. The preset probability threshold may be determined according to factors such as the number of historical users watching the to-be-played video or the degree of interest of the user, that is, the preset probability threshold is not fixed.

In the embodiment of the present disclosure, by determining a candidate video segment with a historical search rate greater than or equal to a preset probability threshold among multiple candidate video segments as the target video segment, the target video segment can be determined within a smaller range, such that a video segment loading requirement of the current user can be met, and the probability of the preloaded video segment being selected by the current user can also be increased.

Considering that a user generally watches a video in a chronological order, when multiple target video segments are acquired, the multiple target video segments may be preloaded as follows. Specifically, the preloading a video in the target video segment includes: determining a playing time point of the target video segment in the to-be-played video; and preloading the video in the target video segment in an order of the playing time point, where the playing time point may be a time point at which the target video segment is played in the to-be-played video.

In an implementation, the server determines a playing time point of each of multiple target video segments in a total video duration of the to-be-played video, and preloads the videos in the multiple target video segments in an order of the playing time point.

For example, the server determines 5 target video segments, and the playing time period of each target video segment is determined as from the $15^{th}$ second to the $20^{th}$ second, from the $150^{th}$ second to the $155^{th}$ second, from the $400^{th}$ second to the $410^{th}$ second, from the $600^{th}$ second to the $610^{th}$ second, and from the $700^{th}$ second to the $710^{th}$ second, each target video segment is preload in a playing order of the target video segment in the to-be-played video.

In the embodiment of the present disclosure, by sequentially loading the determined multiple target video segments in an order of playing time point, the playing habit of the user when watching the video can be met, and when the user jumps to another video segment, the target video segment is already preloaded and can be played smoothly, such that the user does not need to wait for loading the video segment which the user jumped to.

Specifically, the determining a video segment with a historical search rate greater than or equal to a preset probability threshold as a target video segment, and preloading a video in the target video segment includes: acquiring the number of users currently watching the to-be-played video; and determining, in a case that the number of users is greater than or equal to a preset number threshold, a video segment with a historical search rate greater than or equal to a first preset probability threshold as the target video segment, and preloading a video in the target video segment for a first loading length.

The first preset probability threshold may be a preset probability of the historical search rate, and the first loading length may be a duration of the preloaded video of the target video segment.

Specifically, the server may acquire the number of users currently watching the to-be-played video, and in a case that the number of users is greater than or equal to a preset number threshold, a video segment with a historical search rate greater than or equal to the first preset probability threshold is determined as the target video segment, and a video in the target video segment is preloaded for the first loading length. In practice, if the number of users watching the to-be-played video is large, the first preset probability threshold is set to be small, such that there are more determined target video segments, to increase the probability of the preloaded video segment being selected by the current user, and the determined target video segment is preloaded for a shorter loading length.

In the embodiment of the present disclosure, by acquiring the number of users currently watching the to-be-played video, the first preset probability threshold and the first loading length are determined, so that the number of preloaded video segments can be increased and the loading length of the video can be shortened when the number of users is large, to increase the possibility that the current user jumps to a preloaded video segment.

In addition, when the number of current users watching the to-be-played video is small, after acquiring the number of users currently watching the to-be-played video, the method further includes: determining, in a case that the number of users is less than the preset number threshold, a video segment with a historical search rate greater than or equal to a second preset probability threshold as the target video segment, and preloading a video in the target video segment for a second loading length, where the second preset probability threshold is greater than the first preset probability threshold, and the second loading length is greater than the first loading length.

In an implementation, when the number of users watching the to-be-played video is less than the preset number threshold, the video segment with a historical search rate greater than or equal to the second preset probability threshold among multiple target video segments is determined as the target video segment, and the target video segment is preloaded for the second loading length. In practice, the second preset probability threshold is set to be greater than the first preset probability threshold, such that when the number of users watching the to-be-played video is less than the preset number threshold, fewer target video segments are determined, and the target video segment is preloaded for a longer time period.

In the embodiment of the present disclosure, by determining the number of users watching the to-be-played video, different preset probability thresholds are set to determine different target video segments, and videos in the determined number of target video segments are preloaded. In this way, it can be ensured that a video that the user jumps to has been preloaded when the user plays the video in a jumping way, and resource wastes caused by too many preloaded target video segments or too long loading time length can be avoided.

In addition, the determining a video segment with a historical search rate greater than or equal to a preset probability threshold as a target video segment, and preloading a video in the target video segment includes: acquiring a current playing time point of the to-be-played video; and determining, in a case that the current playing time point is within a preset time period, a video segment with a historical search rate greater than or equal to a first preset probability threshold as the target video segment, and preloading a video in the target video segment for a first loading length.

Specifically, the current playing time point may be a specific time point when the current user is watching the to-be-played video. For example, the current playing time point is with a peak period of video play, that is, from 8 pm to 10 pm, or the current playing time point is within a low peak of video play, that is, from 6 am to 10 am.

In an implementation, in a case of determining that the current playing time point of the to-be-played video is within the preset time period, the server determines a video segment with a historical search rate of the target video segment greater than or equal to the first preset probability threshold as the target video segment, and preloads multiple target video segments for the first loading length. For the preloading, reference may be made to the above description of the preloading process, which is not repeated here.

In the embodiment of the present disclosure, by determining different preloading strategies according to different playing time points, it can be ensured that a user can watch a video segment that the user jumps to without waiting when watching the video segment, and a waste of network resources caused by loading to many video segments or loading for a too long time period can also be avoided.

In the case that the determined current playing time point is not within the preset time period, the preloading is performed as follows.

After acquiring the current playing time point of the to-be-played video, the method further includes: determining, in a case that the current playing time point is not within the preset time period, a video segment with a historical search rate greater than or equal to a second preset probability threshold as the target video segment, and preloading a video in the target video segment for a second loading length, where the second preset probability threshold is greater than the first preset probability threshold, and the second loading length is greater than the first loading length.

In an implementation, in a case that the time point that the user plays the to-be-played video is not within the preset time period, a video segment with a historical search rate greater than or equal to a second preset probability threshold is determined as the target video segment, and the target video segment is preloaded for the second loading length. For example, if the user watches the to-be-played video at 8 am and the number of current users is small, a video segment with a historical search rate greater than or equal to the second preset probability threshold among the determined multiple video segments is determined as the target video segment, where the second preset probability threshold may be 70%, and a target video segment with a historical search rate greater than or equal to 70% is preloaded for the second loading length. The second loading length is greater than the first loading length, the second loading length may be 15 seconds, and the first loading length may be 10 seconds, which is not limited in the present disclosure.

It is to be noted that, the video loading method according to the present disclosure can be implemented to only increase the probability that a video segment can be successfully preloaded and is played smoothly when the user jumps to the video segment, so as to ensure that the user can watch the video segment that he jumped to without waiting, but it does not mean that any video segment in the to-be-played video that any user jumps to can be successfully preloaded and played for the user. With the video loading method according to the present disclosure, a possibility that the current user jumps to a preloaded video segment can be increased, and the popularity threshold of the target video segment is adjusted to achieve the balance of the preloaded videos.

In the foregoing embodiment, the server may further determine a preloading strategy for a video segment based on the number of users currently watching the to-be-played video and the current playing time point. However, the preloading strategy for a video segment is not limited to method in the foregoing embodiment. Further, the target video segment may be determined based on the number of bullet screens sent by the current user in the to-be-played video and preloaded for the user, and the preset probability threshold and the loading length may be adjusted according to requirements of the user.

In the embodiment of the present disclosure, by determining different preloading strategies according to different playing time points, it can be ensured that a user can watch a video segment that the user jumps to without waiting when watching the video segment, and a waste of network resources caused by loading to many video segments or loading for a too long time period can also be avoided.

In addition, the video segments may be obtained based on the historical search rates of users, and the video segments may also be obtained based on the distribution density of the bullet screen information of the to-be-played video. Specifically, segmenting the to-be-played video into multiple video segments including: acquiring a distribution density of bullet screen information of the to-be-played video; and segmenting, based on the distribution density of the bullet screen information, the to-be-played video into the plurality of video segments.

Specifically, the distribution density of the bullet screen information may indicate a ratio of the number of bullet screens in each frame of the to-be-played video to the total number of bullet screens in the to-be-played video. In the video play interface, the distribution density of the bullet screen information may be shown as bullet screen number distribution information above a progress bar in the video play interface. In an implementation, the distribution density of the bullet screen information of the to-be-played video is acquired, and the to-be-played video is segmented into multiple video segments based on the distribution density of the bullet screen information, where the video segments may have the same time length or different time lengths. In practice, a user may determine a video segment with a large amount of bullet screen information based on the distribution density of the bullet screens in the play interface of the to-be-played video, which indicates that the video segment is a highly hot segment.

In the embodiment of the present disclosure, the distribution density of the bullet screen information of the to-be-played video is acquired, and the video segments are obtained, so that the preloaded video segment can be accurately determined based on the distribution density of the bullet screen information.

Further, after the segmenting, based on the distribution density of the bullet screen information, the to-be-played video into multiple video segments, the method further includes: acquiring a historical behavior of a current user watching the to-be-played video; and determining, if it is determined that the historical behavior of the current user comprises clicking on a video segment with a distribution density of bullet screen information greater than or equal to a preset density threshold, a video segment in the to-be-played video with a distribution density of bullet screen information greater than or equal to the preset density threshold as the target video segment.

Specifically, the historical behavior of the current user may include the user clicking on a video segment with a distribution density of the bullet screen information greater than or equal to a preset density threshold. The bullet screen density may indicate a degree of density of the number of bullet screens in a video segment when the video segment is played.

In an implementation, according to the historical behavior of the current user, a video segment with a bullet screen density greater than or equal to the preset density threshold is determined as the target video segment, so that a video segment with a higher density in the to-be-played video is preloaded first as the target video segment. In practice, the user may determine the preloaded video segment based on the distribution density of the bullet screen information of the to-be-played video.

In the embodiment of the present disclosure, by determining the video segment with a distribution density of the bullet screen information greater than or equal to the preset density threshold as the target video segment to be loaded first, the accuracy of the preloaded video can be improved, and the played video segment are in line with requirements of users.

In summary, in the embodiment of the present disclosure, the to-be-played video are segmented into multiple video segments, and the historical search rate of each of the video segments is determined based on the historical user behavior of watching the to-be-played video. When the user is a to-be-loaded user, a video segment with a historical search rate greater than a preset threshold is preloaded first, such that when the user fast-forwards the video, a node that the video is fast-forwarded to has been preloaded in the video file, which makes the video play smoothly. In this way, the video play content meets the requirements of users, and users do not need to wait for a long time period of video loading, thereby improving the user experience.

Figure 3:
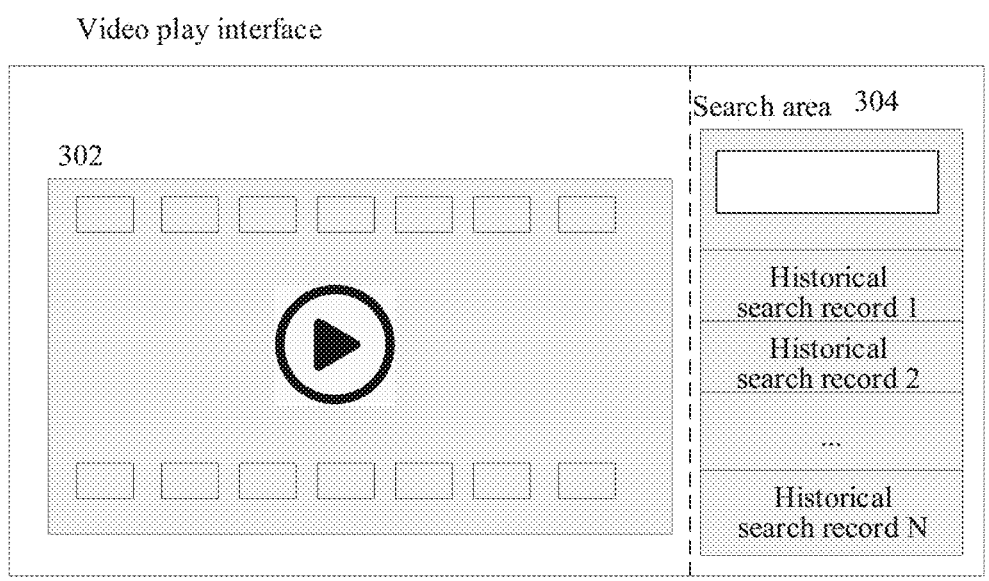
FIG. 3 is schematic diagram of a video playing interface in a video loading method according to an embodiment of the present disclosure.

In the following, with reference to FIG. 3, the application of the video loading method according to the present disclosure on a video play interface is taken as an example to further illustrate the video loading method. FIG. 3 is a schematic diagram of a video loading method according to an embodiment of the present disclosure when being applied on a video playing interface.

FIG. 3 shows a video play interface of a streaming media player. An area 302 in FIG. 3 represents a video play area of the video play interface. The video play area may be used for video play. An area 304 in FIG. 3 represents an area for searching a video segment in the video play interface. The historical search records of historical users may be displayed below the search area 304. The user may know in advance a video segment of the to-be-played video in a hot area of historical users through the historical search records. The historical search records may include information such as a keyword in a video content to be played that is searched by historical users.

Specifically, when acquiring the to-be-played video, the server plays the to-be-played video in the area 302 in FIG. 3, acquires the historical user behavior of watching the to-be-played video, and segment the to-be-played video into multiple video segments for a preset time length. The server may determine a historical search rate of each target video segment based on historical search records of historical users under the search area 304, or search keywords in the search area 304 of FIG. 3. In a case of a to-be-loaded user, a video segment with a historical search rate greater than or equal to a preset probability threshold is determined as a target video segment, and the target video segment is preloaded.

In the embodiment of the present disclosure, the to-be-played video is segmented into multiple video segments, and the historical search rate of each video segment is determined based on the historical user behavior of watching the to-be-played video. When the user is a to-be-loaded user, a video segment with a historical search rate greater than the preset threshold are preloaded first, such that when the user fast-forwards the video, a node that the video is fast-forwarded to has been preloaded in the video file, which makes the video play smoothly. In this way, the play content in the video meets the requirements of the user, and the user does not need to wait for a long time period of video loading, thereby improving the user experience.

Figure 4:
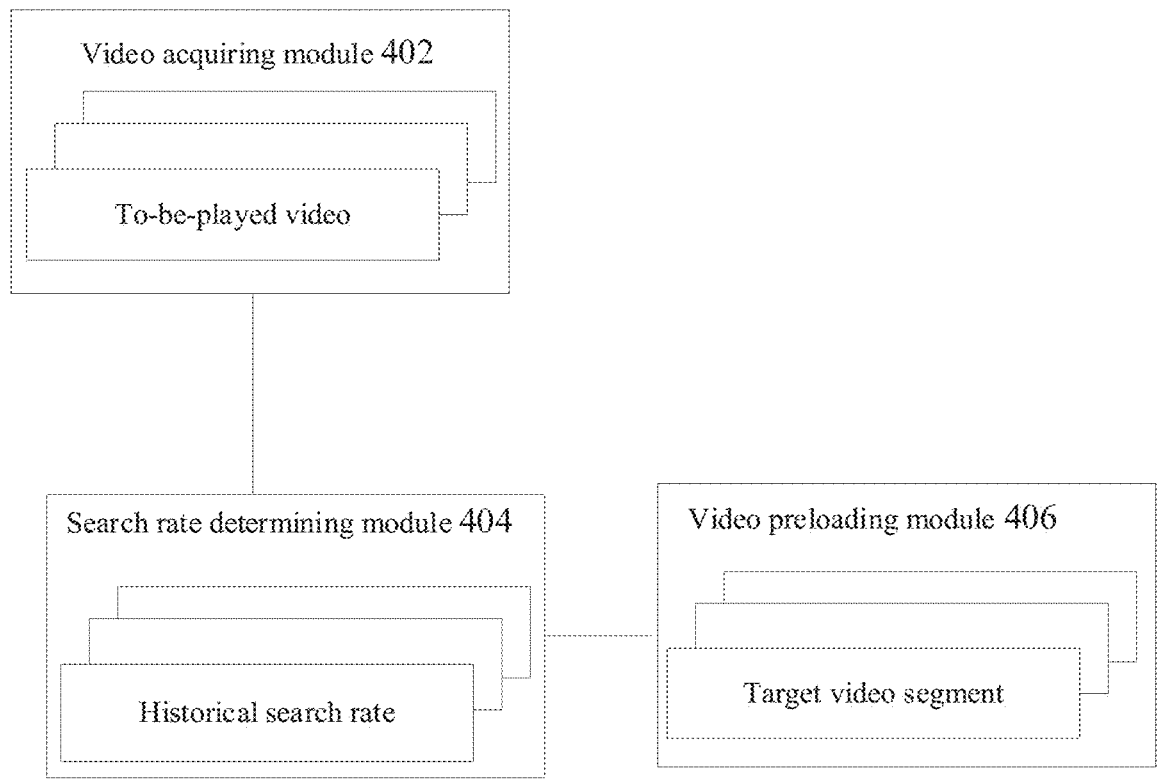
FIG. 4 is a schematic structural diagram of a video loading device according to an embodiment of the present disclosure.

Corresponding to the foregoing method embodiments, a video loading device is further provided according to an embodiment of the present disclosure. FIG. 4 is a schematic structural diagram of a video loading device according to an embodiment of the present disclosure. As shown in FIG. 4, the device includes: a video acquiring module 402, a search rate determining module 404, and a video preloading module 406. The video acquiring module 402 is configured to acquire a to-be-played video and a historical user behavior of watching the to-be-played video in history. The search rate determining module 404 is configured to segment the to-be-played video into multiple video segments, and determine a historical search rate of each of the video segments based on the historical user behavior. The video preloading module 406 is configured to determine a video segment with a historical search rate greater than or equal to a preset probability threshold as a target video segment, and preload a video in the target video segment.

In an embodiment, the video preloading module 406 is further configured to: acquire a historical behavior of a current user watching the to-be-played video; and determine, if it is determined that the current user is a to-be-loaded user based on the historical behavior of the current user, a video segment with a historical search rate greater than or equal to the preset probability threshold as the target video segment.

In an embodiment, the search rate determining module 404 is further configured to: segment the to-be-played video into multiple video segments based on a preset time length.

In an embodiment, the search rate determining module 404 is further configured to: acquiring a distribution density of bullet screen information of the to-be-played video; and segmenting, based on the distribution density of the bullet screen information, the to-be-played video into the multiple video segments.

In an embodiment, the video preloading module 406 is further configured to: acquiring a historical behavior of a current user watching the to-be-played video; and determining, if it is determined that the historical behavior of the current user includes clicking on a video segment with a distribution density of bullet screen information greater than or equal to a preset density threshold, a video segment in the to-be-played video with a distribution density of bullet screen information greater than or equal to the preset density threshold as the target video segment.

In an embodiment, the search rate determining module 404 is further configured to: determining, based on the historical user behavior, the number of times each of the video segments has been searched for by a historical user; and calculating, based on the number of times each of the video segments has been searched for, the historical search rate of each of the video segments in the multiple video segments.

In an embodiment, the video preloading module 406 is further configured to: if it is determined that the current user is not a to-be-loaded user based on the historical behavior of the current user, preloading the to-be-played video in an initial loading way.

In an embodiment, the video loading device further includes: an acquiring and determining module. The acquiring and determining module is configured to acquire attribute information of a current user and attribute information of historical users, and compare the attribute information of the current user with the attribute information of the historical users; and determine a video segment searched by a historical user that matches the attribute information of the current user as a candidate video segment.

In an embodiment, the video preloading module 406 is further configured to: determine a historical search rate of the candidate video segment; and determine a candidate video segment with a historical search rate greater than or equal to the preset probability threshold as the target video segment.

In an embodiment, the video preloading module 406 is further configured to: determine a playing time point of the target video segment in the to-be-played video; and preload the video in the target video segment based on an order of the playing time point.

In an embodiment, the video preloading module 406 is further configured to: acquire the number of users currently watching the to-be-played video; and determine, in a case that the number of users is greater than or equal to a preset number threshold, a video segment with a historical search rate greater than or equal to a first preset probability threshold as the target video segment, and preloading a video in the target video segment for a first loading length.

In an embodiment, the video preloading module 406 is further configured to: determine, in a case that the number of users is less than the preset number threshold, a video segment with a historical search rate greater than or equal to a second preset probability threshold as the target video segment, and preload a video in the target video segment for a second loading length, where the second preset probability threshold is greater than the first preset probability threshold, and the second loading length is greater than the first loading length.

In an embodiment, the video preloading module 406 is further configured to: acquire a current playing time point of the to-be-played video; and determine, in a case that the current playing time point is within a preset time period, a video segment with a historical search rate greater than or equal to a first preset probability threshold as the target video segment, and preloading a video in the target video segment for a first loading length.

In an embodiment, the video preloading module 406 is further configured to: determine, in a case that the current playing time point is not within the preset time period, a video segment with a historical search rate greater than or equal to a second preset probability threshold as the target video segment, and preloading a video in the target video segment for a second loading length, where the second preset probability threshold is greater than the first preset probability threshold, and the second loading length is greater than the first loading length.

In the embodiment of the present disclosure, the to-be-played video is segmented into multiple video segments, and the historical search rate of each video segment is determined based on the historical user behavior of watching the to-be-played video. When the user is a to-be-loaded user, a video segment with a historical search rate greater than the preset threshold are preloaded first, such that when the user fast-forwards the video, a node that the video is fast-forwarded to has been preloaded in the video file, which makes the video play smoothly. In this way, the play content in the video meets the requirements of the user, and the user does not need to wait for a long time period of video loading, thereby improving the user experience.

Figure 5:
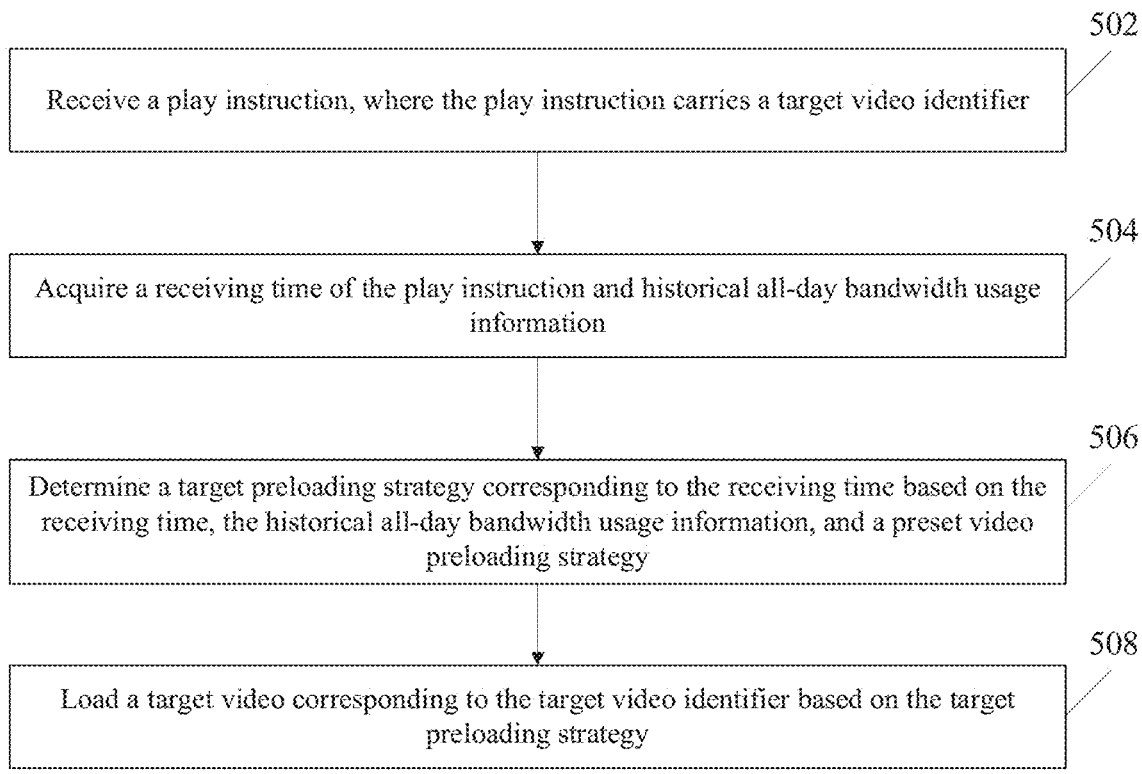
FIG. 5 is a flowchart of a video loading method according to an embodiment of the present disclosure.

FIG. 5 is a flowchart of a video loading method according to an embodiment of the present disclosure, which includes the following steps 502 to 508. In step 502, a play instruction is received, where the play instruction carries a target video identifier.

The play instruction is a play instruction of a target video, and carries the target video identifier. Based on the target video identifier, the target video may be determined and played. The target video identifier may be a title of the target video, a unique code stored for the target video or the like. In the present disclosure, there is no limitation on the form of the target video identifier.

In practice, a user selects video resources from a video resource library by browsing or searching on the internet. When the user finds a video content he wants to watch, he may click on a play button corresponding to the video to send a play instruction to a video server. The instruction carries a target video identifier corresponding to the target video, and the server may play the target video through a streaming media player in a terminal used by the user. However, due to network transmission, there is usually a network delay, so that it is required to preloaded the target video first to provide the user with a better watching experience.

In an embodiment according to the present disclosure, a play instruction sent by a user when watching a target video A through a streaming media player is received as an example, the play instruction carries a target video identifier A.

In step 504, a receiving time of the play instruction and historical all-day bandwidth usage information are acquired. The receiving time of the play instruction is a time when the user clicks to play and watch the target video. If the play instruction sent by the user is received at 8:08, the receiving time is 8:08; if the play instruction sent by the user is received at 17:09, the receiving time is 17:09.

Figure 6:
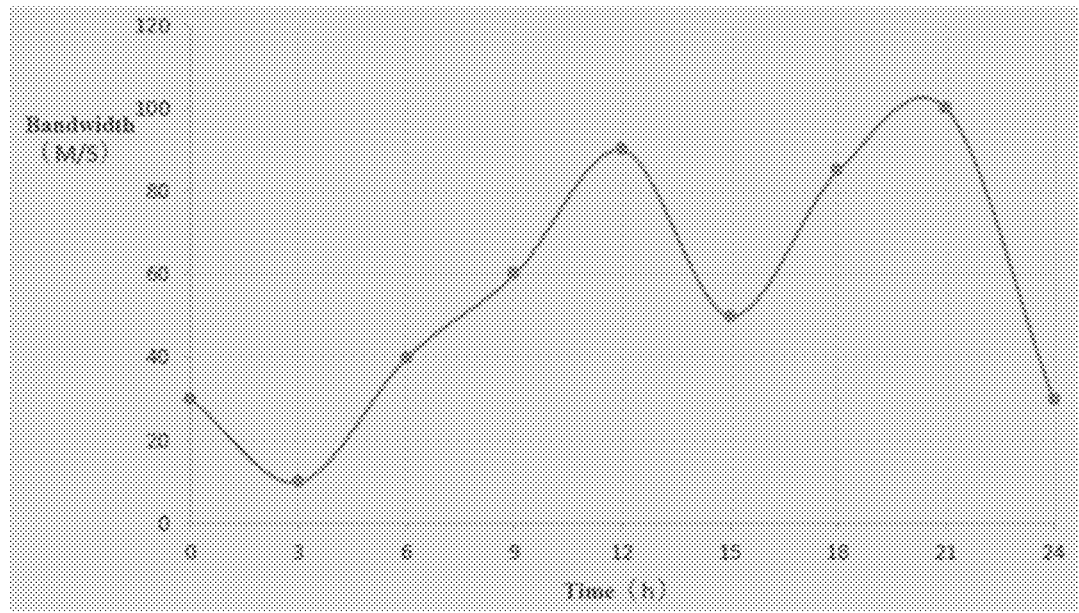
FIG. 6 is a schematic diagram of historical all-day bandwidth usage information according to an embodiment of the present disclosure.

The historical all-day bandwidth usage information reflects a macroscopic global bandwidth usage trend in a whole day. Reference is made to FIG. 6, which is a schematic diagram of historical all-day bandwidth usage information according to an embodiment of the present disclosure. As shown in FIG. 6, according to the all-day bandwidth usage information, a bandwidth usage trough appears around 3:00 in the morning, a first peak appears between 9:00 and 15:00, and a second peak appears between 18:00 and 22:00.

Specifically, the historical all-day bandwidth usage information is acquired in the following steps of: counting bandwidth usage information of each time period in each day of a preset number of historical days; and determining the historical all-day bandwidth usage information based on the bandwidth usage information of each time period in each day of the preset number of historical days.

In practice, the bandwidth usage information of each period in each day of a preset number of historical days is counted, where the preset number of historical days may be 10 days, 20 days, 1 month, 3 months, and the like, and the specific number of historical days is determined according to actual needs.

After counting the bandwidth usage information of each time period in each day, by analyzing the bandwidth usage information of each time period, the historical all-day bandwidth usage information may be acquired. The historical all-day usage information is counted based on the bandwidth usage information of the preset number of historical days.

In an embodiment according to the present disclosure, following the above example, the receiving time of the play instruction is 21:23, and the historical all-day bandwidth usage information is as shown in FIG. 2.

In step 506, a target preloading strategy corresponding to the receiving time is determined based on the receiving time, the historical all-day bandwidth usage information, and a preset video preloading strategy.

The preset video preloading strategy is a reference for determining the target preloading strategy based on the receiving time and historical all-day bandwidth usage information. For example, based on the receiving time and historical all-day bandwidth usage information, if it is found that the bandwidth used at this receiving time is high, which indicates that there is a large number of users, in order to ensure watching experience of most users, a limit may be set on the preloading time length for each target video. If it is found that the bandwidth usage at this time is low based on the receiving time and historical all-day bandwidth usage information, which indicates that there is a small number of users, it is unnecessary to limit the preloading time length for the target video.

Specifically, the target preloading strategy corresponding to the receiving time is determined based on the receiving time, the historical all-day bandwidth usage information and the preset video preloading strategy in the following steps S5062 to S5066.

In step S5062, based on the receiving time and the historical all-day bandwidth usage information, historical time bandwidth usage information corresponding to the receiving time is determined.

The historical time bandwidth usage information is usage information at a specific time determined in the historical all-day bandwidth usage information. The specific time is determined by the receiving time. For example, if the receiving time is 8:00, the bandwidth usage information at the time 8:00 is determined in the historical all-day bandwidth usage information. For example, if the receiving time is 21:00, the bandwidth usage information at the time 21:00 is determined in the historical all-day bandwidth usage information.

In an embodiment according to the present disclosure, following the above example, based on the receiving time 21:23 and the historical all-day bandwidth usage information as shown in FIG. 6, the historical time bandwidth usage information corresponding to the time 21:23 is determined as 92M/S.

In step S1064, a bandwidth utilization rate corresponding to the receiving time is determined based on the historical time bandwidth usage information and the historical all-day bandwidth usage information.

In the actual bandwidth billing mode, the 95 peak billing mode is usually used, that is, billing is determined based on 95% of a peak bandwidth for each day. Therefore, the important factor that affects the bandwidth cost is the peak bandwidth, while the bandwidth usage through will not affect the bandwidth cost.

Based on this, after determining the historical time bandwidth usage information, the bandwidth utilization rate corresponding to the time may be determined based on the historical all-day bandwidth usage information. The bandwidth utilization rate refers to a ratio of the historical time bandwidth usage information corresponding to the receiving time to a total bandwidth. If the bandwidth used at the receiving time is close to a peak bandwidth, in order not to further increase the bandwidth cost, the preloading time length may be reduced to reduce the bandwidth utilization rate.

Specifically, the bandwidth utilization rate corresponding to the receiving time may be determined based on the historical time bandwidth usage information and the historical all-day bandwidth usage information in the following steps of: determining a peak bandwidth based on the historical all-day bandwidth usage information; and determining the bandwidth utilization rate corresponding to the receiving time based on the historical time bandwidth usage information and the peak bandwidth.

In practice, the peak bandwidth used in a day may be determined based on the historical all-day bandwidth usage information, that is, the highest (peak) bandwidth used in a day may be determined, and the bandwidth utilization rate at the actual receiving time may be determined based on the historical time bandwidth usage information and peak bandwidth.

In an embodiment according to the present disclosure, following the above example, the historical time bandwidth usage information corresponding to the receiving time 21:23 is 92M/S. Based on the historical all-day bandwidth usage information, the highest peak of the bandwidth usage information of the whole day may be determined as 100M/S, and it may be determined that the bandwidth utilization rate at the receiving time 21:23 is 92%.

In step S5066, a target preloading strategy corresponding to the receiving time is determined based on the bandwidth utilization rate and a preset video preloading strategy.

The target preloading strategy corresponding to the receiving time is determined based on the bandwidth utilization rate and the preset video preloading strategy. The preset video loading strategy may be set according to actual needs, such as making different bandwidth utilization rates correspond to different preloading time lengths, limiting the preloading time length when the bandwidth utilization rate exceeds the preset threshold, or not limiting the preloading time length when the bandwidth utilization rate is less than or equal to a preset threshold.

Specifically, the target preloading strategy corresponding to the receiving time is determined based on the bandwidth utilization rate and the preset video preloading strategy in the following steps of: determining, in a case that the bandwidth utilization rate is greater than or equal to a preset threshold, that the target preloading strategy corresponding to the receiving time is a first preloading strategy; and determining, in a case that the bandwidth utilization rate is less than the preset threshold, that the target preloading strategy corresponding to the receiving time is a second preloading strategy.

Here, the preset threshold is taken as an example. When the bandwidth utilization rate is greater than or equal to the preset threshold, it indicates that there are many users using bandwidths at this time, and the used bandwidth is close to the peak bandwidth. In this case, the target preloading strategy is determined as the first preloading strategy, and the first preloading strategy indicates limiting the preloading time length.

When the bandwidth utilization is less than the preset threshold, it indicates that there are few users using the bandwidths at this time, and the used bandwidth is far below the peak bandwidth. In this case, the target preloading strategy corresponding to the receiving time at this time may be determined as the second preloading strategy, and the second preloading strategy indicates that it is unnecessary to limit the preloading time length, that is, the target video is completely preloaded.

In an embodiment according to the present disclosure, following the above example, a preset threshold of 70% is taken as an example, the bandwidth utilization rate at the receiving time 21:23 is 92%, and the first preloading strategy is determined to be limiting the preloading time length to 5 minutes.

In another embodiment according to the present disclosure, still taking the preset threshold of 70% as an example, the bandwidth utilization rate at 6:00 in the morning is 40%, and the target preloading strategy at this time is determined as the second loading strategy, and it is unnecessary to limit the preloading time length.

In practice, the target preloading strategy corresponding to the receiving time is determined as the second preloading strategy in the following steps of: determining a playing duration corresponding to the target video based on the target video identifier; and determining, in a case that the playing duration is less than a preset duration, that the target preloading strategy corresponding to the receiving time is the second preloading strategy.

In the present disclosure, the size and playing duration of the target videos are also different. Some videos have a playing duration of ten seconds, some videos have a playing duration of several minutes, some videos have a playing duration of ten minutes or tens of minutes, and some movies may even last for several hours. When a user is watching a long video, he may not watch it all at once. For example, for a two-hour movie, the user may only watch for 50 minutes at a certain time. If the movie is completely preloaded at this time, it may result in a waste of bandwidth cost. Therefore, a playing duration corresponding to the target video may be determined based on the target video identifier. If the playing duration is less than a preset duration, the target preloading strategy corresponding to the receiving time is determined as the second loading strategy, that is, a preloading strategy without limiting the playing duration.

In an embodiment according to the present disclosure, following the above example, the receiving time is 6:00 in the morning, the bandwidth utilization rate at 6:00 in the morning is 40%, and the playing duration corresponding to the target video is determined to be 23 minutes based on the target video identifier A, and a system preset duration is 50 minutes. In this case, the playing duration is less than the preset duration, the target preloading strategy may be determined as the second preloading strategy.

In an embodiment, the method further includes: determining, in a case that the playing duration is greater than or equal to the preset duration, that the target preloading strategy corresponding to the receiving time is a third preloading strategy.

If the playing duration of the target video is greater than or equal to the preset duration, the user may not watch the whole video at one time. If the target video is completely loaded, a waste of resources may be caused. In this case, the target preloading strategy is determined as the third preloading strategy, which is a preloading strategy between the first preloading strategy and the second preloading strategy. Specifically, although the preloading time length of the target video is also limited, but the limited preloading time length is longer than the preloading time length of the first preloading strategy. For example, the first preloading strategy is set as limiting the preloading time length to 5 minutes, the second preloading strategy is set as not limiting the preloading time length, and the third preloading strategy may be set as limiting the preloading time length to 20 minutes. Specifically, the first preloading time length and the third preloading time length are determined according to actual needs.

In another embodiment according to the present disclosure, following the above example, the receiving time is 9:00 in the morning, the bandwidth utilization rate at 9:00 in the morning is 60%, and the playing duration of the target video is determined based on the target video identifier A to be 123 minutes, and the system preset duration is 50 minutes. In this case, the playing duration is longer than the preset duration, and the target preloading strategy may be determined as the third preloading strategy.

In step 508, the target video corresponding to the target video identifier is loaded based on the target preloading strategy. After the target preloading strategy is determined, the target video corresponding to the target video identifier may be preloaded based on the target preloading strategy.

In practice, the method further includes: monitoring a playing time of the target video; determining a play preloading strategy corresponding to the playing time based on the playing time, the historical all-day bandwidth usage information, and the preset video preloading strategy; and loading the target video based on the play preloading strategy.

In practice, a video is played continuously, and a playing time of the target video may be monitored in real time. Based on the playing time and historical all-day bandwidth usage information, a play preloading strategy is determined based on the preset video loading strategy. For example, when the user is using the first preloading strategy to load the target video, and it is monitored that the bandwidth utilization rate corresponding to the playing time is less than the preset threshold, the play preloading strategy may be switched to the second preloading strategy in real time, and the target video is loaded based on the second preloading strategy, thereby providing the user with a better watching experience.

In another embodiment according to the present disclosure, the target video A is played starting at 22:30, and the target video A is loaded based on the first preloading strategy, the preloading time length is limited to 5 minutes, and it is monitored that the bandwidth utilization rate is lower than the preset threshold at the playing time 23:00 in real time. In this case, the play preloading strategy may be switched to the second preloading strategy, that is, the preloading time length is not limited, until the target video A is preloaded.

With the video loading method according to the present disclosure, a play instruction is received, where the play instruction carries a target video identifier; a receiving time of the play instruction and historical all-day bandwidth usage information are acquired; based on the receiving time, the historical all-day bandwidth usage information and a preset video preloading strategy, a target preloading strategy corresponding to the receiving time is determined; based on the target preloading strategy, a target video corresponding to the target video identifier is loaded. With the video loading method in the present disclosure, the preloading strategy corresponding to the current video playing time is determined based on the historical all-day bandwidth usage information and the video playing time, such that the bandwidth utilization rate at the current video playing time can be acquired from a more macro perspective by counting and using the historical all-day bandwidth usage information, and the corresponding preloading strategy can be determined, thereby ensuring the playing quality of the video, and effectively reducing the bandwidth cost and avoiding the waste of bandwidth resources.

Further, the bandwidth utilization rate corresponding to the playing time may be monitored in real time during the playing process, such that the target preloading strategy can be switched in real time, thereby improve the watching experience of the user.

Figure 7:
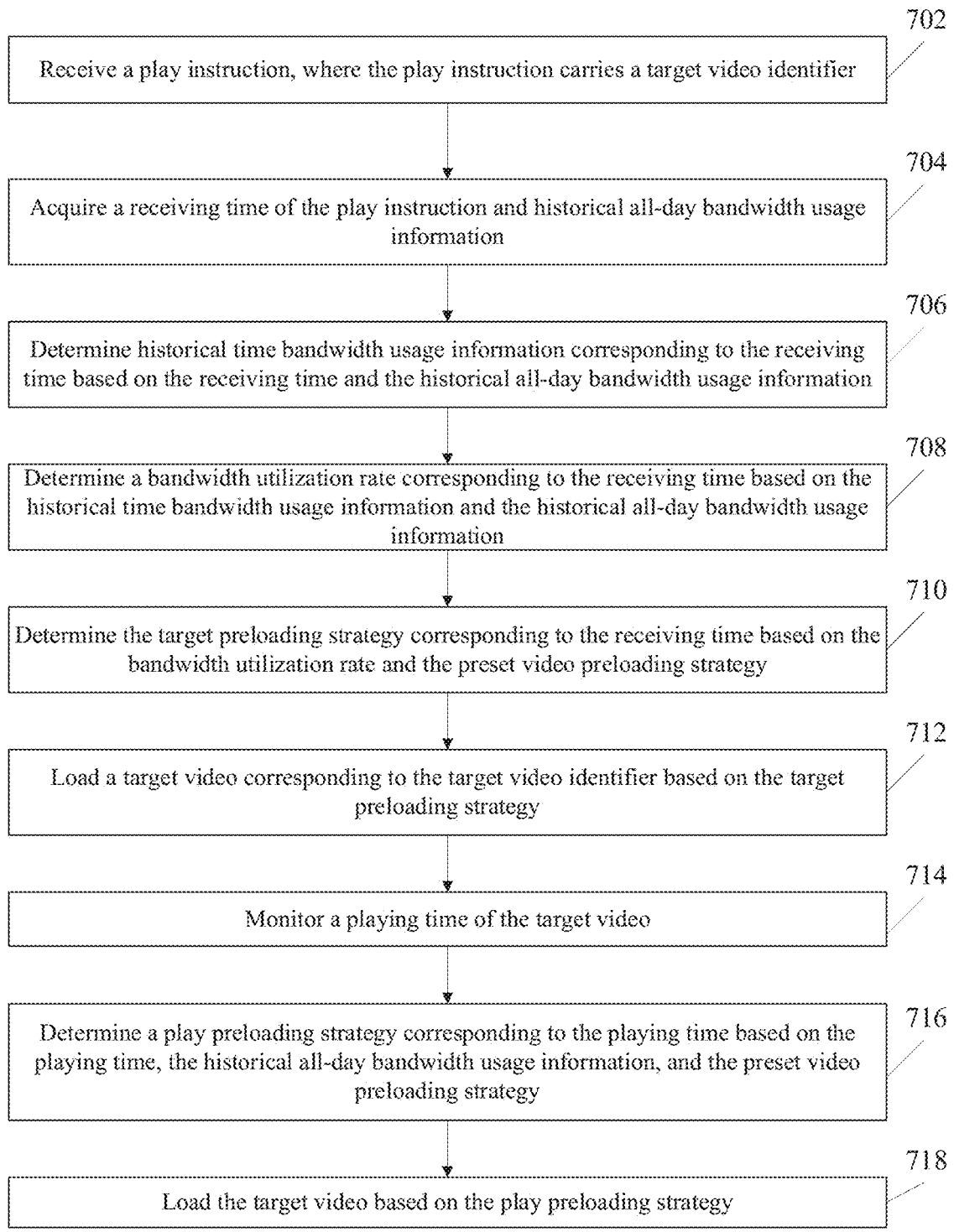
FIG. 7 is a processing flowchart of a video loading method when being applied to a video website according to an embodiment of the present disclosure.

In the following, with reference to FIG. 7, a case that the video loading method according to the present disclosure is applied to a video website is taken as an example to further illustrate the video loading method. FIG. 7 is a processing flowchart of a video loading method when being applied to a video website according to an embodiment of the present disclosure, and the video loading method includes the following steps 702 to 708.

In step 702, a play instruction is received, where the play instruction carries a target video identifier. In the embodiment according to the present disclosure, a play instruction triggered by a user on a video website is received, and the play instruction carries a target video identifier M.

In step 704, a receiving time of the play instruction and historical all-day bandwidth usage information are acquired. In the embodiment according to the present disclosure, the receiving time of acquiring the play instruction is 22:19, and the historical all-day bandwidth usage information is acquired simultaneously.

In step 706, historical time bandwidth usage information corresponding to the receiving time is determined based on to the receiving time and the historical all-day bandwidth usage information. In the embodiment according to the present disclosure, the historical time bandwidth usage information corresponding to the receiving time 22:19 is determined to be 78 M/S based on the historical all-day bandwidth usage information and the receiving time 22:19.

In step 708, the bandwidth utilization rate corresponding to the receiving time is determined based on the historical time bandwidth usage information and the historical all-day bandwidth usage information. In the embodiment according to the present disclosure, a peak bandwidth is determined to be 100M/S based on the historical all-day bandwidth usage information, and the bandwidth utilization rate corresponding to the receiving time 22:19 is determined to be 78%.

In step 710, the target preloading strategy corresponding to the receiving time is determined based on the bandwidth utilization rate and the preset video preloading strategy.

In the embodiment according to the present disclosure, the preset threshold is 70%, and the bandwidth utilization rate corresponding to the receiving time 22:19 is 78%, which is greater than the preset threshold. In this case, the target preloading strategy is determined to as the first preloading strategy, that is, limiting the preloading time length of the target video to 3 minutes.

In step 712, the target video corresponding to the target video identifier is loaded based on the target preloading strategy. In the embodiment according to the present disclosure, the target video M corresponding to the target video identifier M is loaded based on the first preloading strategy, that is, when the target video M is played, a video content of next 3 minutes is preloaded to improve the watching experience of the user.

In step 714, the playing time of the target video is monitored. In the embodiment according to the present disclosure, the playing time of the target video is monitored in real time.

In step 716, a play preloading strategy corresponding to the playing time is determined based on the playing time, the historical all-day bandwidth usage information, and a preset video preloading strategy. In the embodiment according to the present disclosure, when the target video M at a playing time 22:30 is played, the historical time bandwidth usage information corresponding to the playing time 22:30 is 67M/S, and the bandwidth utilization rate corresponding to the playing time 22:30 is determined to be 67%, which is less than the preset threshold of 70%. In this case, the play preloading strategy corresponding to the playing time is determined as the second preloading strategy, that is, the preloading time length is not limited.

In step 718, the target video is loaded based on the play preloading strategy. In the embodiment according to the present disclosure, at a playing time 22:30, the second preloading strategy is used to load the target video M, that is, the preloading time length of the target video M is not limited, which further improves the watching experience of the user.

With the video loading method according to the present disclosure, a play instruction is received, where the play instruction carries a target video identifier; a receiving time of the play instruction and historical all-day bandwidth usage information are acquired; based on the receiving time, the historical all-day bandwidth usage information and a preset video preloading strategy, a target preloading strategy corresponding to the receiving time is determined; based on the target preloading strategy, a target video corresponding to the target video identifier is loaded. With the video loading method in the present disclosure, the preloading strategy corresponding to the current video playing time is determined based on the historical all-day bandwidth usage information and the video playing time, such that the bandwidth utilization rate at the current video playing time can be acquired from a more macro perspective by counting and using the historical all-day bandwidth usage information, and the corresponding preloading strategy can be determined, thereby ensuring the playing quality of the video, and effectively reducing the bandwidth cost and avoiding the waste of bandwidth resources.

Figure 8:
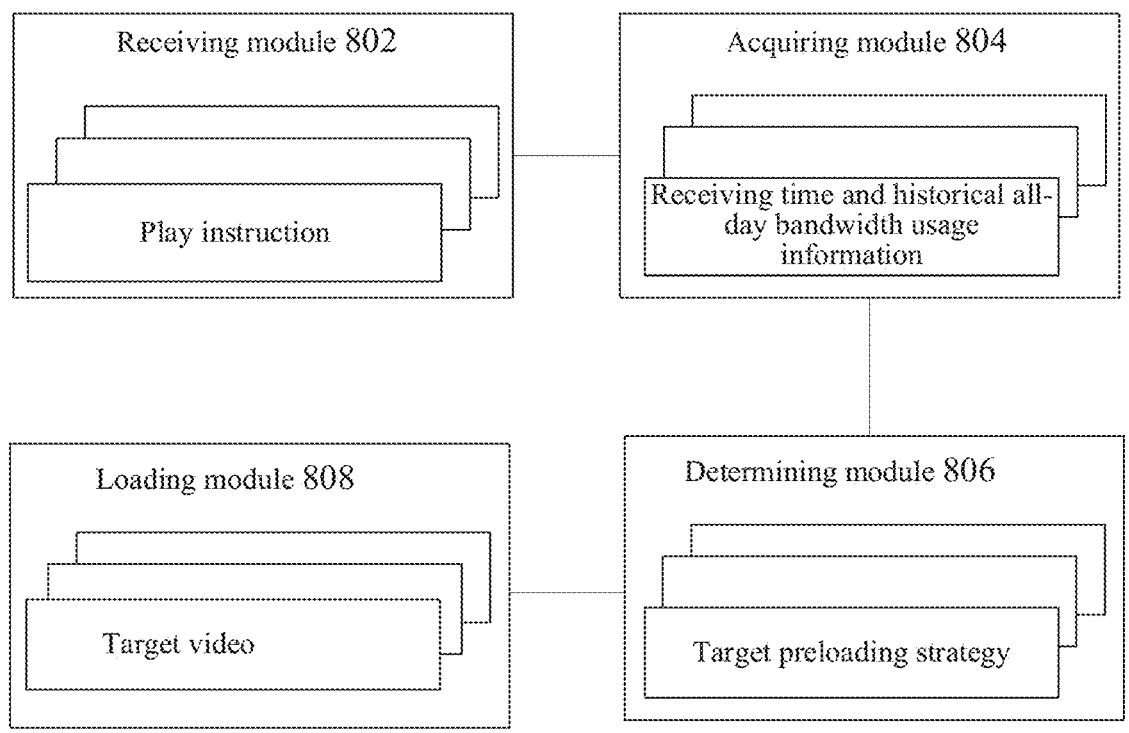
FIG. 8 is a schematic structural diagram of a video loading device according to an embodiment of the present disclosure.

Corresponding to the above method embodiments, a video loading device is further provided according to an embodiment of the present disclosure, and FIG. 8 shows a schematic structural diagram of a video loading device according to an embodiment of the present disclosure. As shown in FIG. 8, the device includes: a receiving module 802, an acquiring module 808, a determining module 806, and a loading module 808. The receiving module 802 is configured to receive a play instruction, where the play instruction carries a target video identifier. The acquiring module 804 is configured to count a receiving time of the play instruction and historical all-day bandwidth usage information. The determining module 806 is configured to determine a target preloading strategy corresponding to the receiving time based on the receiving time, the historical all-day bandwidth usage information, and a preset video preloading strategy. The loading module 808 is configured to load a target video corresponding to the target video identifier based on the target preloading strategy.

In an embodiment, the acquiring module 804 is further configured to: acquire bandwidth usage information of each time period in each day of a preset number of historical days; and determine the historical all-day bandwidth usage information based on the bandwidth usage information of each time period in each day of the preset number of historical days. In an embodiment, the determining module 806 is further configured to: determine historical time bandwidth usage information corresponding to the receiving time based on the receiving time and the historical all-day bandwidth usage information; determine a bandwidth utilization rate corresponding to the receiving time based on the historical time bandwidth usage information and the historical all-day bandwidth usage information; and determine the target preloading strategy corresponding to the receiving time based on the bandwidth utilization rate and the preset video preloading strategy.

In an embodiment, the determining module 806 is further configured to: determine a peak bandwidth based on the historical all-day bandwidth usage information; and determine the bandwidth utilization rate corresponding to the receiving time based on the historical time bandwidth usage information and the peak bandwidth.

In an embodiment, the determining module 806 is further configured to: determine, in a case that the bandwidth utilization rate is greater than or equal to a preset threshold, that the target preloading strategy corresponding to the receiving time is a first preloading strategy; and determine, in a case that the bandwidth utilization rate is less than the preset threshold, that the target preloading strategy corresponding to the receiving time is a second preloading strategy.

In an embodiment, the determining module 806 is further configured to: determine a playing duration corresponding to the target video based on the target video identifier; and determine, in a case that the playing duration is less than a preset duration, that the target preloading strategy corresponding to the receiving time is the second preloading strategy.

In an embodiment, the determining module 806 is further configured to: determine, in a case that the playing duration is greater than or equal to the preset duration, that the target preloading strategy corresponding to the receiving time is a third preloading strategy.

In an embodiment, the device further includes: a monitoring module configured to monitor a playing time of the target video. The determining module is further configured to determine a play preloading strategy corresponding to the playing time based on the playing time, the historical all-day bandwidth usage information, and the preset video preloading strategy. The loading module is further configured to load the target video based on the play preloading strategy.

With the video loading device according to the present disclosure, a play instruction is received, where the play instruction carries a target video identifier; a receiving time of the play instruction and historical all-day bandwidth usage information are acquired; based on the receiving time, the historical all-day bandwidth usage information and a preset video preloading strategy, a target preloading strategy corresponding to the receiving time is determined; based on the target preloading strategy, a target video corresponding to the target video identifier is loaded. With the video loading device in the present disclosure, the preloading strategy corresponding to the current video playing time is determined based on the historical all-day bandwidth usage information and the video playing time, such that the bandwidth utilization rate at the current video playing time can be acquired from a more macro perspective by counting and using the historical all-day bandwidth usage information, and the corresponding preloading strategy can be determined, thereby ensuring the playing quality of the video, and effectively reducing the bandwidth cost and avoiding the waste of bandwidth resources.

Further, the bandwidth utilization rate corresponding to the playing time may be monitored in real time during the playing process, such that the target preloading strategy can be switched in real time, thereby improve the watching experience of the user.

Figure 9:
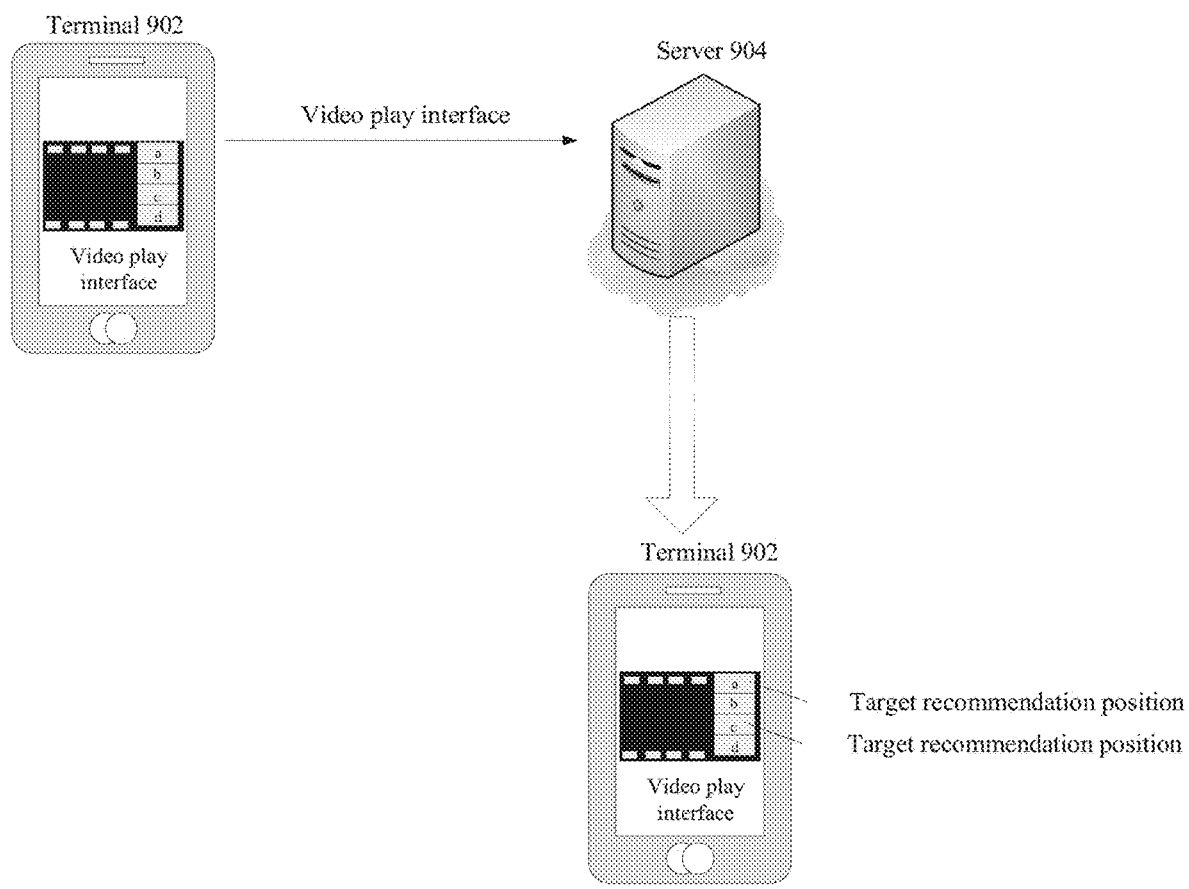
FIG. 9 is a schematic diagram of an exemplary application scenario of a video loading method according to an embodiment of the present disclosure.

Referring to FIG. 9, FIG. 9 is a schematic diagram of an exemplary application scenario of a video loading method according to an embodiment of the present disclosure.

The application scenario of FIG. 9 includes a terminal 902 and a server 904. Specifically, a user sends a video play interface to the server through the terminal 902. After receiving the video play interface, the server acquires a recommendation position set in a recommendation list on the right side of the video play interface. The recommendation position set includes a recommendation position a, a recommendation position b, a recommendation position c, and a recommendation position d. A historical click rate of each recommendation position is calculated based on the number of times that each recommendation position is clicked by historical users, and the recommendation position a, the recommendation position b, the recommendation position c, and the recommendation position d are ranked based on the historical click rate of each recommendation position, and finally, a preset loading number of recommendation positions are selected from the ranked recommendation position set as target recommendation positions. For example, if the historical click rate of the recommendation position a is 50%, the historical click rate of the recommendation position b is 5%, the historical click rate of the recommendation position c is 30%, and the historical click rate of the recommendation position d is 15%, the ranked recommendation position set is listed as: the recommendation position a, the recommendation position c, the recommendation position d, and the recommendation position b. If the preset loading number is 2, the preset loading number of target recommendation positions that are selected from the ranked recommendation position set include the recommendation position a and the recommendation position c. In this case, videos in the recommendation position a and the recommendation position c may be preloaded.

The video loading method according to the embodiment of the present disclosure is performed by taking the advantage that a video in a target recommendation position is clicked with a high probability, the target recommendation position is determined, and the video in the target recommendation position can be preloaded, such that the starting speed of the video in the recommendation position can be optimized, thereby reducing the duration for loading the video header.

Figure 10:
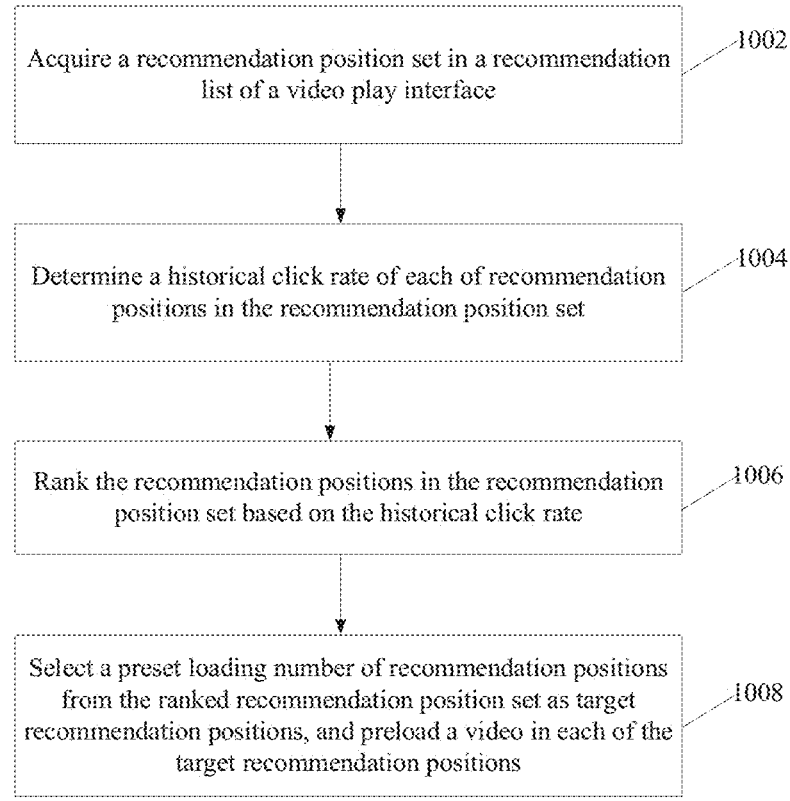
FIG. 10 is a flowchart of a video loading method according to an embodiment of the present disclosure.

Referring to FIG. 10, FIG. 10 is a flowchart of a video loading method according to an embodiment of the present disclosure. The video loading method includes the following steps 1002 to 1008. In step 1002, a recommendation position set in a recommendation list of a video playing interface is acquired. The recommendation position set includes at least two or more recommendation positions.

Specifically, the video play interface may be a video play interface displayed in a streaming media player, and there is a video currently being played in the video play interface. There is a recommendation position area around the video play interface. The recommendation position area is generally displayed in the form of a recommendation list, and each recommendation list includes at least two or more recommendation positions, and the at least two or more recommendation positions form a recommendation position set.

Figure 11:
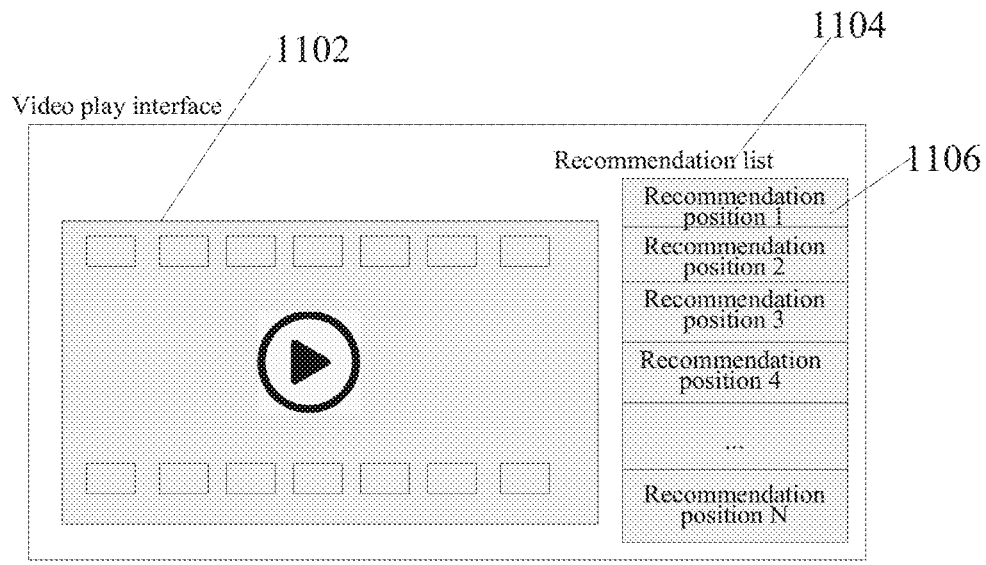
FIG. 11 is schematic diagram of a video playing interface in a video loading method according to an embodiment of the present disclosure.

Referring to FIG. 11, FIG. 11 is a schematic diagram of a video playing interface in a video loading method according to an embodiment of the present disclosure.

FIG. 11 shows a video play interface in a streaming media player. An area 1102 in FIG. 11 represents a video play area of the video play interface. This video play area may be used for video play. An area 1104 in FIG. 11 represents a recommendation list area of the video play interface, which includes multiple recommendation positions 1106.

In step 1004, a historical click rate of each of recommendation positions in the recommendation position set is determined. Specifically, the determining a historical click rate of each of recommendation positions in the recommendation position set includes: acquiring a historical click amount of each of recommendation positions in the recommendation position set; and calculating the historical click rate of each of recommendation positions in the recommendation position set based on the historical click amount of each of recommendation positions.

In practice, each of recommendation positions in the recommendation position set may be clicked by multiple users during historical display, after acquiring the recommendation position set in the recommendation list of the video play interface, a historical click amount is calculated based on the number of times each recommendation position is clicked by users during the historical display. For example, a recommendation position 1 has been clicked by ten users before being displayed in the current video play interface, then the historical click amount of the recommendation position 1 is 10.

After acquiring the historical click amount of each recommendation position in the recommendation position set, based on the historical click amount of each recommendation position, the historical click rate of each recommendation position in the recommendation position set composed of all recommendation positions is calculated. For example, if the recommendation position set includes a recommendation position 1, a recommendation position 2, a recommendation position 3, and a recommendation position 4, and the historical click amount of the recommendation position 1 is 60, the historical click amount of the recommendation position 2 is 70, the historical click amount of the recommendation position 3 is 40, and the historical click amount of the recommendation position 4 is 90, based on the historical click amount of each of the recommendation position 1, the recommendation position 2, the recommendation position 3 and the recommendation position 4, the historical click rate of each recommendation position is calculated as follows. The historical click rate of the recommendation position 1 is calculated as 60/160=37.5%, the historical click rate of recommendation 2 is calculated as 70/160=43.75%, the historical click rate of recommendation 3 is calculated as 40/160=25%, and the historical click rate of recommendation 4 is calculated as 90/160=56.25%.

In the embodiment of the present disclosure, the historical click rate of each recommendation position in the recommendation position set is calculated based on the historical click amount of each recommendation position, and based on the historical click rate, it may be determined which recommendation positions are more likely to be clicked by the users. Therefore, videos in the recommendation positions that are more likely to be clicked by the users are preloaded, so that the loading time period of the video in the recommendation position can be greatly shortened after the user clicks on the video, thereby improving the user experience.

In step 1006, the recommendation positions in the recommendation position set are ranked based on the historical click rate. Specifically, after acquiring the historical click rate of each of recommendation positions in the recommendation position set, the recommendation positions in the recommendation position set are ranked based on the historical click rate of each of recommendation positions, for example, the recommendation positions are ranked in a descending order.

Still taking the recommendation position set including the recommendation position 1, the recommendation position 2, the recommendation position 3, and the recommendation position 4 as an example, if the historical click rate of the recommendation position 1 is 37.5%, the historical click rate of the recommendation position 2 is 43.75%, the historical click rate of the recommendation position 3 is 25%, and the historical click rate of recommendation position 4 is 56.25%, based on the historical click rate, the recommendation positions in the recommendation position set are ranked in a descending order, that is, the recommendation position 4, the recommendation position 2, the recommendation position 1, and the recommendation position 3.

In step 1008, a preset loading number of recommendation positions are selected from the ranked recommendation position set as target recommendation positions, and a video in each of the target recommendation positions is preloaded. The preset loading number may be set according to actual needs, for example, the preset loading number may be 2 or 3.

In practice, a large preset loading number indicates a large target recommendation position, and multiple videos needs to be preloaded. However, when there are many preloaded videos, the network bandwidth cost may increase accordingly. Therefore, when setting the preset loading number, the balance between the network bandwidth cost and the preloaded video profit should be considered, and the preset loading number should not be set too large just for only obtaining more preloaded videos.

Specifically, after the preset loading number is set, the preset loading number of recommendation positions are selected from the ranked recommendation position set as the target recommendation positions, and the videos in the target recommendation positions are preloaded. For example, if the preset loading number is 2, two recommendation positions are selected from the ranked recommendation position set as the target recommendation positions, and videos in the two target recommendation positions are preloaded.

In an embodiment, the ranking the recommendation positions in the recommendation position set based on the historical click rate includes: ranking the recommendation positions in the recommendation position set in a descending order based on the historical click rate Correspondingly, the selecting a preset loading number of recommendation positions from the ranked recommendation position set as target recommendation positions includes: selecting the preset loading number of top-ranked recommendation positions from the ranked recommendation position set as the target recommendation positions.

In practice, after determining the historical click rate of each of recommendation positions in the recommendation position set, the recommendation positions in the recommendation position set are ranked in a descending order based on the historical click rate, and the preset loading number of top-ranked recommendation positions are selected as the target recommendation positions.

Following the above example, if the preset loading number is 2, 2 top-ranked recommendation positions (that is, the recommendation position 4 and the recommendation position 2) are selected from the ranked recommendation position set (including the recommendation position 4, the recommendation position 2, the recommendation position 1, and the recommendation position 3) as the target recommendation positions.

In the embodiment of the present disclosure, the preset loading number of recommendation positions with high historical click rates are selected as the target recommendation positions, and a video in each of the target recommendation positions is preloaded. If the historical click rate of a target recommendation position is high, a current user may also click the video in the target recommendation position to watch with a high probability. In this case, the video in the target recommendation position is preloaded, and when the user clicks the video in the target recommendation position to watch, the video may be directly played without causing loading jams, which can provide a good user experience.

In another embodiment of the present disclosure, the selecting a preset loading number of recommendation positions from the ranked recommendation position set as target recommendation positions, and preloading a video in each of the target recommendation positions, includes: acquiring a number of users currently browsing the video playing interface; and selecting, in a case that the number of users is greater than or equal to a preset number threshold, a first preset loading number of recommendation positions from the ranked recommendation position set as the target recommendation positions, and preloading a video in each of the target recommendation positions for a first loading length.

The number of users currently browsing the video play interface may be the number of users currently watching the video through a streaming media player. For example, if there are 1000 users currently watching a video on the video play interface through streaming media players, the number of users is 1000. The preset number threshold may be set according to actual needs, for example, the preset number threshold may be 600, 800, or the like, and the first preset loading number also needs to be set according to actual needs and based on the number of all recommendation positions in the recommendation list of the video play interface. For example, if the number of all recommendation positions in the recommendation list of the video play interface is 5, the first preset loading number may be set to any number smaller than or equal to 5, such as 5, 4, 3, 2, or 1.

Following the above example, in a case that the preset number threshold is 800 and the first preset loading number is 3, if the number of users currently browsing the video play interface is 1000, it may be determined that the number 1000 of users is greater than or equal to the preset number threshold 800, and 3 recommendation positions (that is, the recommendation position 4, the recommendation position 2, the recommendation position 1) are selected from the ranked recommendation position set (including the recommendation position 4, the recommendation position 2, the recommendation position 1, and the recommendation position 3) as the target recommendation positions, and videos in the three target recommendation positions (that is, the recommendation position 4, the recommendation position 2, the recommendation position 1) are preloaded for the first loading length. The first loading length may be set according to the actual needs, for example, 5 seconds of video content, 10 seconds of video content, or the like may be preloaded.

In the embodiment of the present disclosure, the number of target recommendation positions and the preloading length of the video in the target recommendation position are determined based on the number of users currently browsing the video play interface, so as to balance between the profit and the cost of video preloading. For example, in a case of a large number of users, the first preset loading number is set to be large, so that more target recommendation positions are selected; and in a case of more target recommendation positions, in order to save the bandwidth cost, the preloading length of the video in each target recommendation position may be set to be short. In this way, more target recommendation positions can be set in the case of a large number of users to ensure the probability that users click on the target recommendation positions, further, the preloading length of the video in the target recommendation position is set to be short to avoid an increase in the bandwidth cost.

In another case, after acquiring the number of users currently browsing the video play interface, the method further includes: selecting, in a case that the number of users is less than the preset number threshold, a second preset loading number of recommendation positions from the ranked recommendation position set as the target recommendation positions, and preloading a video in each of the target recommendation positions for a second loading length, where the second preset loading number is less than or equal to the first preset loading number, and the second loading length is greater than the first loading length.

For the description of the preset number threshold, reference may be made to the above embodiments, which will not be repeated here. The second preset loading number and the second loading length may be set according to actual needs. In practice, the second preset loading number is less than or equal to the first preset loading number, and the second loading length is greater than the first loading length. For example, if the first preset loading number is 3, the second preset loading number is any positive integer less than or equal to 3; if the first loading length is 5 seconds, the second loading length is any positive integer greater than 5 seconds.

Following the above example, in a case that the preset number threshold is 800 and the second preset loading number is 2, if the number of users currently browsing the video play interface is 600, it may be determined that the number 600 of users is less than the preset number threshold 800, and 2 recommendation positions (that is, the recommendation position 4, the recommendation position 2) or 3 recommendation positions (that is, the recommendation position 4, the recommendation position 2, the recommendation position 1) are selected from the ranked recommendation position set (including the recommendation position 4, the recommendation position 2, the recommendation position 1, and the recommendation position 3) as the target recommendation positions, and the videos in the 2 recommendation positions (that is, the recommendation position 4, the recommendation position 2) or 3 recommendation positions (that is, the recommendation position 4, the recommendation position 2, the recommendation position 1) are preloaded for the second loading length. The second loading length may be set according to actual needs, for example, if the first loading length is 5 seconds, the second loading length may be 10 seconds that is greater than the first loading length.

In the embodiment of the present disclosure, the number of target recommendation positions and the preloading length of the video in the target recommendation position are determined based on the number of users currently browsing the video play interface, so as to balance between the profit and the cost of video preloading. For example, in the case of a small number of users, the second preset loading number is set to be small, so that fewer target recommendation positions are selected; and in the case of fewer target recommendation positions, the preloading length of the video in each target recommendation position is set to be long. In this way, the number of target recommendation positions is reduced and the preloading length of the video in the target recommendation position is increased in a case of the small number of users, to ensure that users click on the target recommendation positions while experiencing a long preloading length of the video in the target recommendation position. In addition, without increasing the bandwidth cost, users can experience a long and smooth video play experience. Alternatively, without changing the number of target recommendation positions, the preloading length of the video in each target recommendation position is set to be long, such that the number of target recommendation positions is not changed while only the preloading length of the video in the target recommendation position is increased in a case of the small number of users, the user can also click on the target recommendation position with a high probability while experiencing the long preloading length of the video in the target recommendation position.

In another embodiment of the present disclosure, the selecting a preset loading number of recommendation positions from the ranked recommendation position set as target recommendation positions, and preloading a video in each of the target recommendation positions, includes: acquiring a current playing time of the video playing interface; and selecting, in a case that the current playing time is within a preset time period, a first preset loading number of recommendation positions from the ranked recommendation position set as the target recommendation positions, and preloading a video in each of the target recommendation positions for a first loading length.

The preset time period may be set according to actual needs, for example, the preset time period is from 11:00 to 14:00, and from 18:00 to 23:00. In practice, the preset time period may be a time period where most users are free, and during this time period, the number of users of the video play interface may be more. The number of target recommendation positions and the loading length of the video may be adjusted for this time period to balance between the profit and the cost of video preloading.

Specifically, for the description of the first preset loading number and the first loading length, reference may be made to the above embodiment, which will not be repeated here.

Following the above example, in a case that the preset time period is from 11:00 to 14:00, and 18:00 to 23:00, and the first preset loading number is 3, if the current play time of the video play interface is 12:00, it may be determined that the current playing time is within the preset time period, and three recommendation positions (that is, the recommendation position 4, the recommendation position 2, the recommendation position 1) are selected from the ranked recommendation position set (including the recommendation position 4, the recommendation position 2, the recommendation position 1, and the recommendation position 3) as the target recommendation positions, and the videos in the three target recommendation position (that is, the recommendation position 4, the recommendation position 2, the recommendation position 1) are preloaded for the first loading length. The first loading length may be set according to actual needs, for example, 5 seconds of video content, or 10 seconds of video content may be preloaded.

In the embodiment of the present disclosure, the number of target recommendation positions and the preloading length of the video in the target recommendation positions are determined based on the current play time of the currently browsed video play interface, so as to balance between the profit and the cost of video preloading. For example, in the case that most users are free, the first preset loading number is set to be large, such that more target recommendation positions are selected; in the case of more target recommendation positions, in order to save bandwidth cost, the preloading length of the video in each target recommendation position may be set to be short. In this way, more target recommendation positions can be set in a case that the number of users is large in a time period where most users are free, to ensure the probability that the user clicks on the target recommendation position, and further, the preloading length of the video in the target recommendation position is set to be short, to avoid an increase in bandwidth cost.

In another case, after acquiring the current playing time of the video playing interface, the method further includes: selecting, in a case that the current playing time is not within the preset time period, a second preset loading number of recommendation positions from the ranked recommendation position set as the target recommendation positions, and preloading a video in each of the target recommendation positions for a second loading length, where the second preset loading number is less than or equal to the first preset loading number, and the second loading length is greater than the first loading length.

For description of the preset time period, the second preset loading number, and the second loading length, reference may be made to the above embodiments, which will not be repeated here. In practice, the second preset loading number is less than or equal to the first preset loading length, the second loading length is greater than the first loading length. For example, if the first preset loading number is 3, the second preset loading number is any positive integer less than or equal to 3; if the first loading length is 5 seconds, the second loading length is any positive integer greater than 5 seconds.

Following the above example, in a case that the preset time period is from 11:00 to 14:00, and from 18:00 to 23:00, and the second preset loading number is 2, if the current play time on the video play interface is 10:00, it may be determined that the current playing time is not within the preset time period. In this case, two recommendation positions (that is, the recommendation position 4 and the recommendation position 2) or three recommendation positions (including the recommendation position 4, the recommendation position 2, the recommendation position 1) are selected from the ranked recommendation position set (including the recommendation position 4, the recommendation position 2, the recommendation position 1, and the recommendation position 3) as target recommendation positions, and videos in the two recommendation positions (that is, the recommendation position 4 and the recommendation position 2) or three recommendation positions (including the recommendation position 4, the recommendation position 2, the recommendation position 1) are preloaded for the second loading length. The second loading length may be set according to the actual needs. For example, if the first loading length is 5 seconds, the second loading length may be 10 seconds or the like that is greater than the first loading length.

In the embodiment of the present disclosure, the number of target recommendation positions and the preloading length of the video in the target recommendation positions are determined based on the current play time of the video play interface, so as to balance between the profit and the cost of video preloading. For example, in a case that most users are busy, the second preset loading number is set to be small, such that fewer target recommendation positions are selected; and in a case of fewer target recommendation positions, the preloading length of the video in each target recommendation position is set to be long. In this way, the number of target recommendation positions is reduced and the preloading length of the video in the target recommendation position is increased in a case that the number of users is small when most users are busy, such that the users can click on the target recommendation positions while experiencing a long preloading length of the video in the target recommendation position. In addition, without increasing the bandwidth cost, users can experience a long and smooth video play experience. Alternatively, without changing the number of target recommendation positions, the preloading length of the video in each target recommendation position is set to be long, such that the number of target recommendation positions is not changed while only the preloading length of the video in the target recommendation position is increased in a case of the small number of users, the user can also click on the target recommendation position with a high probability while experiencing the long preloading length of the video in the target recommendation position.

In another embodiment of the present disclosure, after the selecting a preset number of recommendation positions from the ranked recommendation position set as target recommendation positions, the method further includes: sending a preset target video to each of the target recommendation positions.

The preset target video includes but is not limited to a video to be recommended that is associated with the currently played video, or a video that needs to increase the click rate and play amount of the video.

In practice, the target recommendation position is a recommendation position that the user may click with a high probability. In this case, if the video that needs to increase the video click rate and play amount is arranged in the target recommendation position, the probability of the video being clicked by the user will increase, that is, the click rate and play amount of the video may be greatly improved.

In an embodiment, after the preloading a video in each of the target recommendation positions, the method further includes: acquiring a loading cost and a loading profit of preloading the video in each of the target recommendation positions; and adjusting the preset loading number based on the loading cost and the loading profit.

In specific implementations, preloading the video in the target recommendation position will incur loading costs, such as the bandwidth cost, but preloading the video in the target recommendation position will also bring loading profits, such as improving the exposure rate of the video or the user stickiness to the video play platform. Therefore, in practice, the setting of the preset loading number is extremely important. If the preset loading number is selected to be too large and there may be too many target recommendation positions, the cost of preloading the video is high while the profit generated by preloading of the video is low, so the cost is not proportional to the profit; and if the preset loading number is selected to be too small and there are too few target recommendation positions, the probability that the target recommendation position is clicked by the user is small, so the exposure rate of the video in the target recommendation position will also be low. Therefore, in practice, the preset loading number may be adjusted based on the loading cost and the loading profit generated by preloading the video each time, to determine a reasonable number of target recommendation positions based on the preset loading number, so that the loading cost and loading profit of the video in the target recommendation position are proportional to each other, thereby improving the user experience.

With the video loading method according to an embodiment of the present disclosure, the historical click rate of each of the recommendation positions in the recommendation list is calculated, and the preset loading number of recommendation positions with high historical click rates are determined as the target recommendation positions, and videos in the target recommendation positions are preloaded, by taking an advantage that the video in the target recommendation position is clicked with a high probability, the video in the target recommendation position is preloaded to reduce the waiting duration for loading the first frame of the video in the target recommendation position, thereby improving the user experience.

Figure 12:
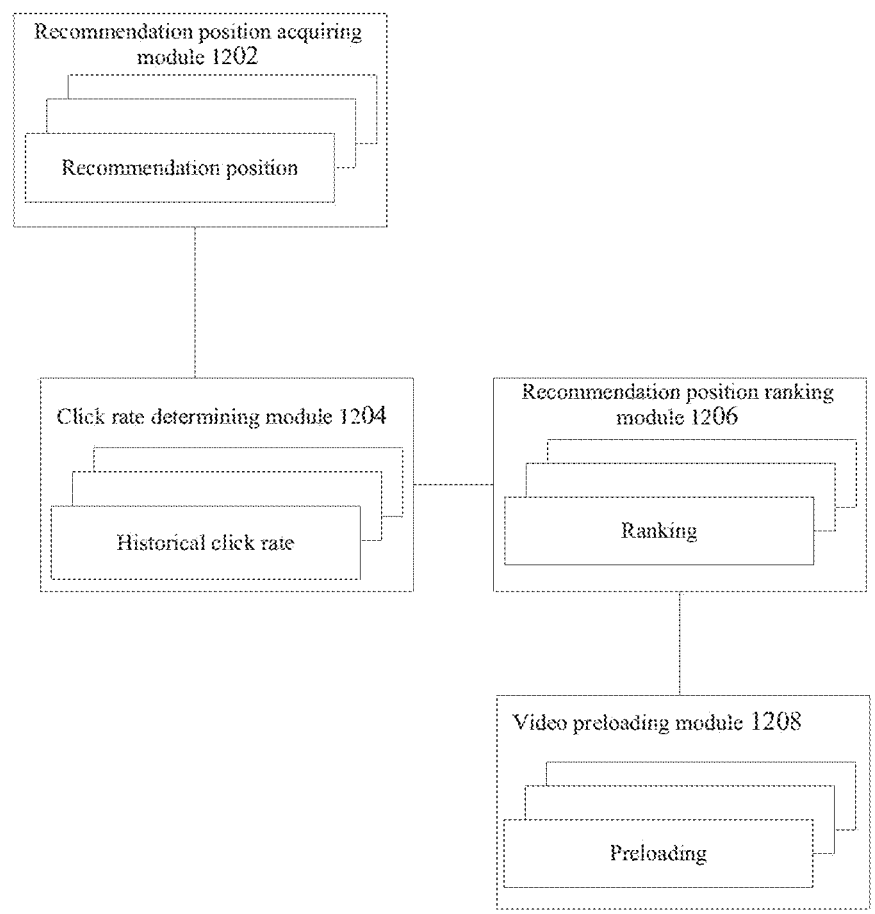
FIG. 12 is a schematic structural diagram of a video loading device according to an embodiment of the present disclosure.

Corresponding to the foregoing method embodiments, a video loading device is further provided according to an embodiment of the present disclosure, and FIG. 4 shows a schematic structural diagram of a video loading device according to an embodiment of the present disclosure. As shown in FIG. 12, the device includes: a recommendation position acquiring module 1202, a click rate determining module 1204, a recommendation position ranking module 1206, and a video preloading module 1208. The recommendation position acquiring module 1202 is configured to acquire a recommendation position set in a recommendation list of a video playing interface. The click rate determining module 1204 is configured to determine a historical click rate of each of recommendation positions in the recommendation position set. The recommendation position ranking module 1206 is configured to rank the recommendation positions in the recommendation position set based on the historical click rate. The video preloading module 1208 is configured to select a preset loading number of recommendation positions from the ranked recommendation position set as target recommendation positions, and preload a video in each of the target recommendation positions.

In an embodiment, the click rate determining module 1204 is further configured to: acquire a historical click amount of each of recommendation positions in the recommendation position set; and calculate the historical click rate of each of recommendation positions in the recommendation position set based on the historical click amount of each of recommendation positions.

In an embodiment, the recommendation position ranking module 1206 is further configured to: rank the recommendation positions in the recommendation position set in a descending order based on the historical click rate.

Correspondingly, the video preloading module 1208 is further configured to: select the preset loading number of top-ranked recommendation positions from the ranked recommendation position set as the target recommendation positions.

In an embodiment, the video preloading module 1208 is further configured to: acquire a number of users currently browsing the video playing interface; and select, in a case that the number of users is greater than or equal to a preset number threshold, a first preset loading number of recommendation positions from the ranked recommendation position set as the target recommendation positions, and preload a video in each of the target recommendation positions for a first loading length.

In an embodiment, the device further includes: a second preloading module. The second preloading module is configured to select, in a case that the number of users is less than the preset number threshold, a second preset loading number of recommendation positions from the ranked recommendation position set as the target recommendation positions, and preload a video in each of the target recommendation positions for a second loading length, where the second preset loading number is less than or equal to the first preset loading number, and the second loading length is greater than the first loading length.

The video preloading module 1208 is further configured to: acquire a current playing time of the video playing interface; and select, in a case that the current playing time is within a preset time period, a first preset loading number of recommendation positions from the ranked recommendation position set as the target recommendation positions, and preload a video in each of the target recommendation positions for a first loading length.

In an embodiment, the device further includes: a second preloading module. The second preloading module is configured to select, in a case that the current playing time is not within the preset time period, a second preset loading number of recommendation positions from the ranked recommendation position set as the target recommendation positions, and preload a video in each of the target recommendation positions for a second loading length, where the second preset loading number is less than or equal to the first preset loading number, and the second loading length is greater than the first loading length.

In an embodiment, the device further includes: a video sending module. The video sending module is configured to send a preset target video to each of the target recommendation positions.

In an embodiment, the device further includes: an adjusting module. The adjusting module is configured to acquire a loading cost and a loading profit of preloading the video in each of the target recommendation positions; and adjust the preset loading number based on the loading cost and the loading profit.

With the video loading device according to an embodiment of the present disclosure, the historical click rate of each of the recommendation positions in the recommendation list is calculated, and the preset loading number of recommendation positions with high historical click rates are determined as the target recommendation positions, and videos in the target recommendation positions are preloaded, by taking an advantage that the video in the target recommendation position is clicked with a high probability, the video in the target recommendation position is preloaded to reduce the waiting duration for loading the first frame of the video in the target recommendation position, thereby improving the user experience.

The above described is a schematic solution of a video loading device of the embodiment. It should be noted that the technical solution of the video loading device belongs to the same concept as the technical solution of the above video loading method. For details of the technical solution of the video loading device that are not described in detail, reference may be made to the description of the technical solution of the above video loading method.

Figure 13:
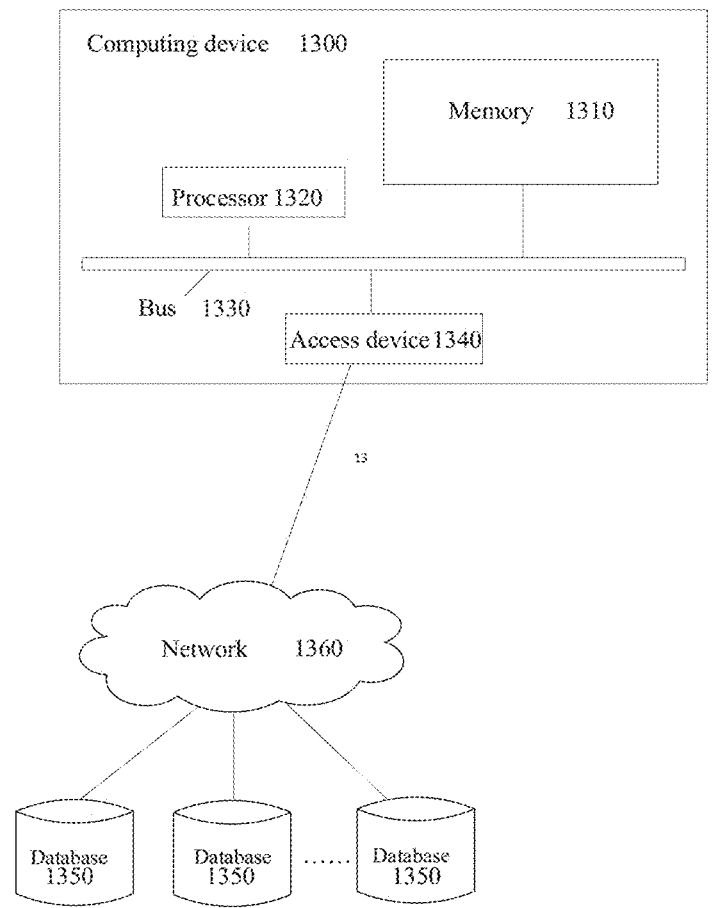
FIG. 13 is a structural block diagram of a computing device according to an embodiment of the present disclosure.

Referring to FIG. 13, FIG. 13 is a structural block diagram of a computing device 1300 according to an embodiment of the present disclosure. The components of the computing device 1300 include but are not limited to a memory 1310 and a processor 1320. The processor 1320 and the memory 1310 are connected to each other through a bus 1330, and the database 1350 is used to store data.

The computing device 1300 further includes an access device 1340, which enables the computing device 1300 to communicate via one or more networks 1360. Examples of these networks include a public switched telephone network (PSTN), a local area network (LAN), a wide area network (WAN), a personal area network (PAN), or a combination of communication networks such as the Internet. The access device 1340 may include one or more of any type of wired or wireless network interfaces (for example, a network interface card (NIC)), such as an IEEE802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, and a near field communication (NFC) interface.

In an embodiment of the present disclosure, the above components of the computing device 1300 may also be connected to other components not shown in FIG. 13, for example, via a bus. It is to be understood that the structural block diagram of the computing device shown in FIG. 13 is only for the purpose of example, and is not intended to limit the scope of the present disclosure. Those skilled in the art may add or replace other components as needed.

The computing device 1300 may be any type of stationary or mobile computing device, including a mobile computer or a mobile computing device (for example, a tablet computer, a personal digital assistant, a laptop computer, a notebook computer, and a netbook), a mobile phone (for example, a smart phone), a wearable computing device (for example, a smart watch, smart glasses) or other types of mobile devices, or a stationary computing device such as a desktop computer or a PC. The computing device 1300 may also be a mobile or stationary server.

The processor 1320 is configured to execute computer-executable instructions to perform steps of the video loading method.

The above described is a schematic solution of a computing device of the embodiment. It should be noted that the technical solution of the computing device belongs to the same concept as the technical solution of the above video loading method. For details of the technical solution of the computing device that are not described in detail, reference may be made to the description of the technical solution of the above video loading method.

A computer-readable storage medium is further provided according to an embodiment of the present disclosure, which stores a computer instruction. The computer instruction, when executed by a processor, performs steps of the video loading method.

The above described is a schematic solution of a computer-readable storage medium of the embodiment. It should be noted that the technical solution of the computer-readable storage medium belongs to the same concept as the technical solution of the above video loading method. For details of the technical solution of the computer-readable storage medium that are not described in detail, reference may be made to the description of the technical solution of the above video loading method.

Specific embodiments of the present disclosure are described in the above, and other embodiments are also within the scope of the claims. In some cases, actions or steps described in the claims may be performed in a different order than in the embodiments and still achieve desired results. In addition, processes shown in the drawings are not necessarily performed in the specific order or sequential order in order to achieve the desired results. In some embodiments, multi-task processing and parallel processing are also possible or may be advantageous.

The computer instructions include computer program codes, and the computer program codes may be in the form of source codes, object codes, executable files, or some intermediate forms. The computer-readable medium may include: any entity or device capable of carrying the computer program codes, a recording medium, a U disk, a mobile hard disk, a magnetic disk, an optical disk, a computer memory, a read-only memory (ROM), a random-access memory (RAM), an electrical carrier signal, a telecommunication signal, and a software distribution medium, and the like. It is to be noted that the content contained in the computer-readable medium may be appropriately added or deleted based on the requirements of the legislation and patent practice in the jurisdiction. For example, in some jurisdictions, based on the legislation and patent practice, the computer-readable medium does not include electrical carrier signals and telecommunication signals.

It is to be noted that, for simplicity of description, the above method embodiments are described as combinations of a series of operations, but those skilled in the art should know that the present disclosure is not limited to the described sequence of operations. According to on the present disclosure, some steps may be performed in another order or at simultaneously. Secondly, those skilled in the art should also know that the embodiments described in the present disclosure are all preferred embodiments, and the operations and modules involved are not necessarily all required by the present disclosure.

In the above embodiments, the description of each embodiment has its own emphasis. For parts that are not described in detail in an embodiment, reference may be made to related descriptions in the other embodiments.

The preferred embodiments of the present disclosure disclosed above are only used to help explain the present disclosure. Details of the present disclosure are not descried completely in the preferred embodiments, and the present disclosure is not limit to the preferred embodiments described above. Apparently, many modifications and changes may be made based on the content of the present disclosure. These preferred embodiments are selected and specifically described in the present disclosure, in order to better explain the principles and practice of the present disclosure, so that those skilled in the art may understand and use the present disclosure. The present disclosure is only limited by the claims and full scope and equivalents thereof.

What is claimed is:

1. A method of preloading video data, comprising:
   acquiring a video to be played;
   acquiring information indicative of historical behaviors of users who watched the video;
   segmenting the video into a plurality of video segments, wherein the segmenting the video into a plurality of video segments comprises:
   acquiring a distribution density of bullet screen associated with the video, and
   segmenting the video into the plurality of video segments based on the distribution density of bullet screen;
   determining a historical search rate corresponding to each of the plurality of video segments based on the information indicative of the historical behaviors of the users; and
   determining a video segment among the plurality of video segments as a first target video segment based on the historical search rate corresponding to each of the plurality of video segments, wherein the video segment has a historical search rate greater than or equal to a preset probability threshold;
   preloading the first target video segment of the video;
   wherein the method further comprises:
   acquiring information indicative of historical behaviors of a current user who is currently watching the video;
   determining that the historical behaviors of the current user comprise clicking on at least one video segment with a distribution density of bullet screen greater than or equal to a preset distribution density threshold;
   determining a video segment among the plurality of video segments with a distribution density of bullet screen greater than or equal to the preset distribution density threshold as a second target video segment; and wherein the method further comprises causing to display an interface, the interface comprising a first area and a second area, the first area configured to play the video, the second area configured to enable search of a video segment among the plurality of video segments, and the second area further configured to display historical search records.

2. The method according to claim 1, wherein the segmenting the video into a plurality of video segments comprises:
segmenting the video into the plurality of video segments based on a preset time length.

3. The method according to claim 1, wherein the determining a historical search rate corresponding to each of the plurality of video segments further comprises:
determining a number of times each of the plurality of video segments has been searched by the users who watched the video based on the information indicative of the historical behaviors of the users; and
determining the historical search rate corresponding to each of the plurality of video segments based on the number of times each of the plurality of video segments has been searched.

4. The method according to claim 1, further comprising:
acquiring attribute information associated with a current user who is currently watching the video and attribute information associated with the users who watched the video;
comparing the attribute information associated with the current user to the attribute information associated with the users who watched the video; and
determining at least one video segment searched by at least one subset of the users as at least one candidate video segment, wherein attribute information associated with the at least one subset of the users matches the attribute information associated with the current user.

5. The method according to claim 4, wherein the determining a video segment among the plurality of video segments as a first target video segment further comprises:
determining at least one historical search rate corresponding to the at least one candidate video segment; and
determining a candidate video segment among the at least one candidate video segment as the first target video segment, wherein the candidate video segment has a historical search rate greater than or equal to the preset probability threshold.

6. The method according to claim 1, wherein the preloading the first target video segment further comprises:
determining time points of playing frames in the first target video segment; and
preloading the first target video segment based on an order of the time points.

7. The method according to claim 1, further comprising:
acquiring a number of users who are currently watching the video;
determining that the number of the users currently watching the video is greater than or equal to a preset number threshold;
determining a video segment with a historical search rate greater than or equal to a first preset probability threshold as the first target video segment; and
preloading a first length of the first target video segment.

8. The method according to claim 7, further comprising:
determining that the number of the users currently watching the video is less than the preset number threshold;

determining a video segment with a historical search rate greater than or equal to a second preset probability threshold as the first target video segment; and
preloading a second length of the first target video segment, wherein the second length is greater than the first length.

9. The method according to claim 1, further comprising:
acquiring a current playing time point of playing the video;
determining that the current playing time point is within a preset time period;
determining a video segment with a historical search rate greater than or equal to a first preset probability threshold as the first target video segment; and
preloading a first length of the first target video segment.

10. The method according to claim 9, further comprising:
determining that the current playing time point is not within the preset time period;
determining a video segment with a historical search rate greater than or equal to a second preset probability threshold as the first target video segment; and
preloading a second length of the target video segment, wherein the second preset probability threshold is greater than the first preset probability threshold, and the second length is greater than the first length.

11. A system, comprising:
at least one processor; and
at least one memory communicatively coupled to the at least one processor and comprising computer-readable instructions that upon execution by the at least one processor cause the at least one processor to perform operations comprising:
acquiring a video to be played;
acquiring information indicative of historical behaviors of users who watched the video;
segmenting the video into a plurality of video segments, wherein the segmenting the video into a plurality of video segments comprises:
acquiring a distribution density of bullet screen associated with the video, and
segmenting the video into the plurality of video segments based on the distribution density of bullet screen;
determining a historical search rate corresponding to each of the plurality of video segments based on the information indicative of the historical behaviors of the users; and
determining a video segment among the plurality of video segments as a first target video segment based on the historical search rate corresponding to each of the plurality of video segments, wherein the video segment has a historical search rate greater than or equal to a preset probability threshold;
preloading the first target video segment of the video;
wherein the operations further comprise:
acquiring information indicative of historical behaviors of a current user who is currently watching the video;
determining that the historical behaviors of the current user comprise clicking on at least one video segment with a distribution density of bullet screen greater than or equal to a preset distribution density threshold;
determining a video segment among the plurality of video segments with a distribution density of bullet screen greater than or equal to the preset distribution density threshold as a second target video segment; and wherein the operations further comprise causing to display an interface, the interface comprising a first area and a second area, the first area configured to play the video, the second area configured to enable search of a video segment among the plurality of video segments, and the second area further configured to display historical search records.

12. The system according to claim 11, the operations further comprising:
acquiring attribute information associated with a current user who is currently watching the video and attribute information associated with the users who watched the video;
comparing the attribute information associated with the current user to the attribute information associated with the users who watched the video; and
determining at least one video segment searched by at least one subset of the users as at least one candidate video segment, wherein attribute information associated with the at least one subset of the users matches the attribute information associated with the current user.

13. The system according to claim 12, wherein the determining a video segment among the plurality of video segments as a first target video segment further comprises:
determining at least one historical search rate corresponding to the at least one candidate video segment; and
determining a candidate video segment among the at least one candidate video segment as the first target video segment, wherein the candidate video segment has a historical search rate greater than or equal to the preset probability threshold.

14. The system according to claim 11, the operations further comprising:
acquiring a current playing time point of playing the video;
determining that the current playing time point is within a preset time period;
determining a video segment with a historical search rate greater than or equal to a first preset probability threshold as the first target video segment; and
preloading a first length of the first target video segment.

15. The system according to claim 14, further comprising:
determining that the current playing time point is not within the preset time period;
determining a video segment with a historical search rate greater than or equal to a second preset probability threshold as the first target video segment; and
preloading a second length of the target video segment, wherein the second preset probability threshold is greater than the first preset probability threshold, and the second length is greater than the first length.

16. A non-transitory computer-readable storage medium, storing computer-readable instructions that upon execution by a processor cause the processor to implement operations comprising:
acquiring a video to be played;
acquiring information indicative of historical behaviors of users who watched the video;
segmenting the video into a plurality of video segments, wherein the segmenting the video into a plurality of video segments comprises:
acquiring a distribution density of bullet screen associated with the video, and
segmenting the video into the plurality of video segments based on the distribution density of bullet screen;
determining a historical search rate corresponding to each of the plurality of video segments based on the information indicative of the historical behaviors of the users; and
determining a video segment among the plurality of video segments as a first target video segment based on the historical search rate corresponding to each of the plurality of video segments, wherein the video segment has a historical search rate greater than or equal to a preset probability threshold;
preloading the first target video segment of the video;
wherein the operations further comprise:
acquiring information indicative of historical behaviors of a current user who is currently watching the video;
determining that the historical behaviors of the current user comprise clicking on at least one video segment with a distribution density of bullet screen greater than or equal to a preset distribution density threshold;
determining a video segment among the plurality of video segments with a distribution density of bullet screen greater than or equal to the preset distribution density threshold as a second target video segment; and
wherein the operations further comprise causing to display an interface, the interface comprising a first area and a second area, the first area configured to play the video, the second area configured to enable search of a video segment among the plurality of video segments, and the second area further configured to display historical search records.

* * * * *